United States Patent [19]

Gokey et al.

[11] 4,254,329

[45] Mar. 3, 1981

[54] MICROFICHE INFORMATION RETRIEVAL AND CONTROL SYSTEM UTILIZING MACHINE READABLE MICROFICHE AND VISUALLY READABLE MICROFICHE

[75] Inventors: Phillip E. Gokey; Donovan W. Hurlbut; Emma L. Sederholm; Angel F. Terry, all of Whitewater, Wis.

[73] Assignee: News Log International Incorporated, Whitewater, Wis.

[21] Appl. No.: 956,426

[22] Filed: Oct. 31, 1978

[51] Int. Cl.³ .................. G06F 15/30; G06K 7/10; G03B 27/08
[52] U.S. Cl. .................. 235/379; 235/454; 235/385; 353/27 A
[58] Field of Search .......... 235/454, 379; 250/570, 250/555, 566, 568, 569; 353/27 A

[56] References Cited

U.S. PATENT DOCUMENTS

| | | | |
|---|---|---|---|
| 3,371,324 | 2/1968 | Sinoto | 235/454 |
| 3,506,806 | 4/1970 | Hawkins et al. | 235/454 |
| 3,549,895 | 12/1970 | Sidorsky | 235/454 |
| 3,655,949 | 4/1972 | Rinn | 235/454 |
| 4,086,469 | 4/1978 | Toriumi et al. | 235/92 MP |
| 4,097,846 | 6/1978 | Lewis | 340/146.3 H |
| 4,110,020 | 8/1978 | Johnson et al. | 250/570 |
| 4,158,194 | 6/1979 | McWaters et al. | 235/454 |

FOREIGN PATENT DOCUMENTS

| | | |
|---|---|---|
| 2046860 | 7/1971 | Fed. Rep. of Germany . |
| 2151125 | 10/1971 | Fed. Rep. of Germany . |
| 2533938 | 7/1975 | Fed. Rep. of Germany . |
| 2647831 | 4/1978 | Fed. Rep. of Germany . |

*Primary Examiner*—Daryl W. Cook
*Attorney, Agent, or Firm*—Hill, Van Santen, Steadman, Chiara & Simpson

[57] ABSTRACT

A parts management and inventory control system includes a microfiche data base of two types of microfiche cards. One type is machine readable only, while the other type card bears machine readable information and visually readable information. The microfiche cards bear digital information for machine reading. The digital information includes information to be read as output data and/or information for controlling a microfiche card transport or a scanner transport in order to accurately position microfiche cards for information retrieval. The system may interface with a central computer for parts ordering, cancellation and the like, and a printer provides a permanent business record. The system may also be employed in the field of finance in order to provide credit or bank account information with complete privacy with respect to the identification of the person whose account is being checked.

28 Claims, 17 Drawing Figures

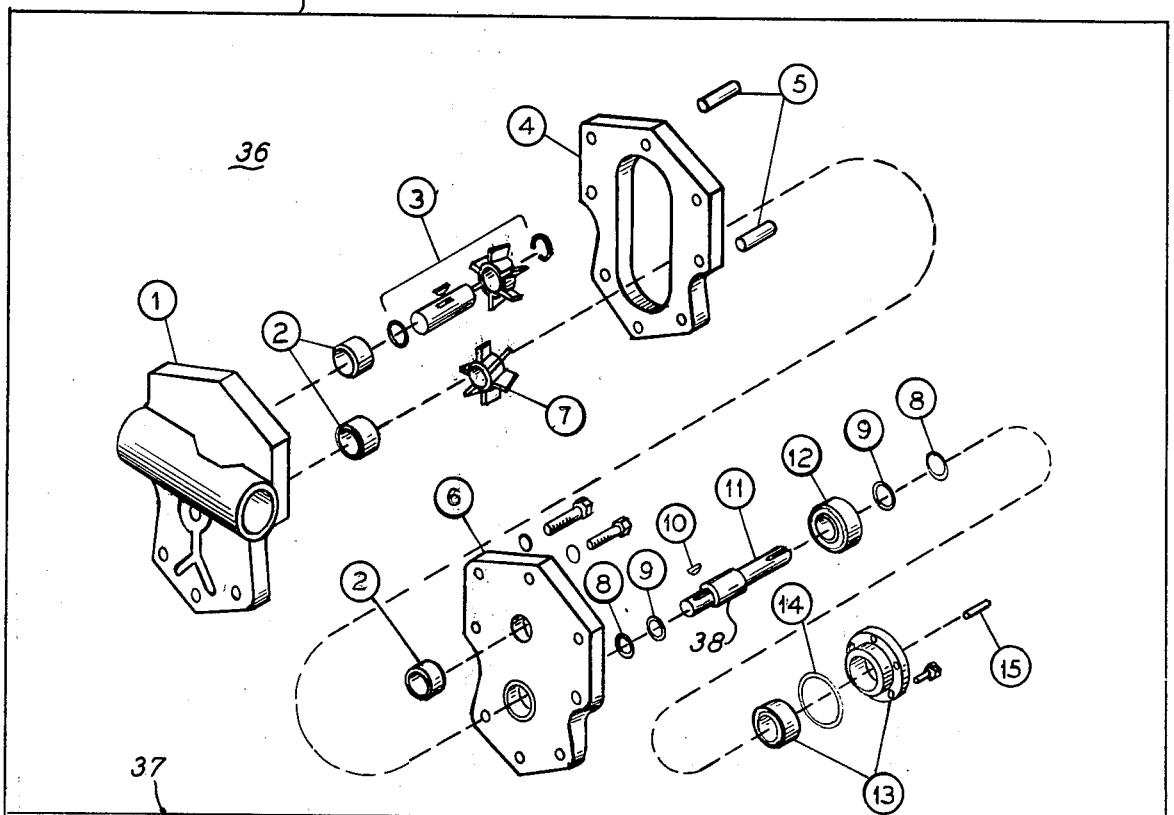

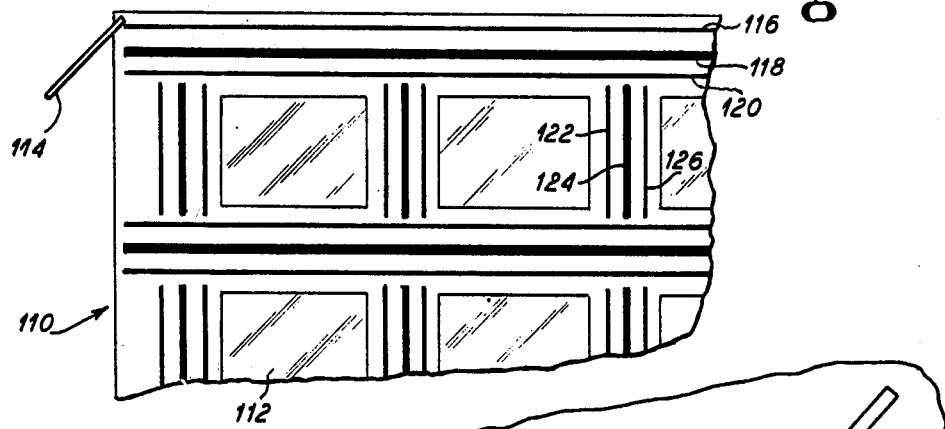
Fig. 8
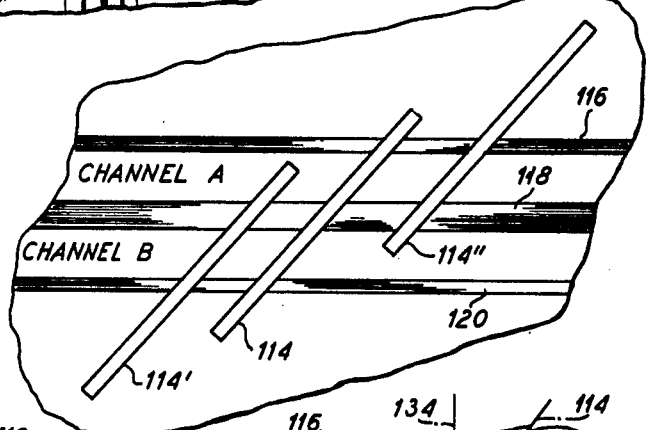
Fig. 9
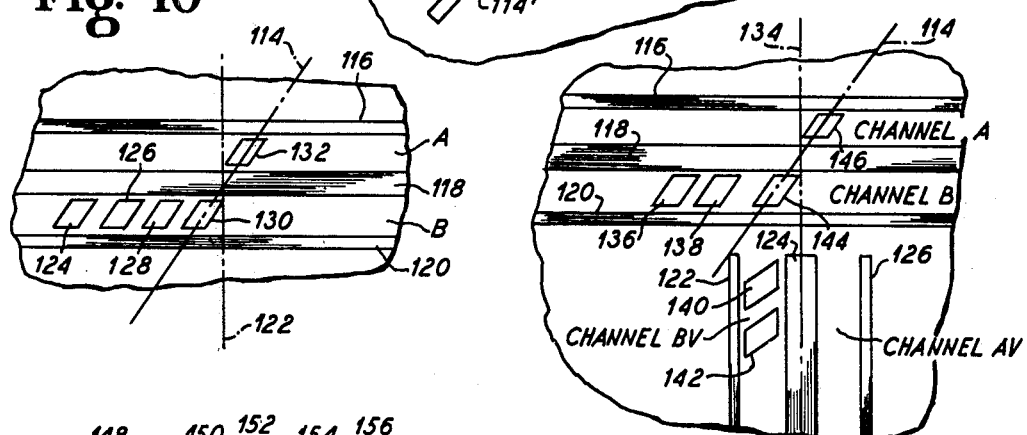
Fig. 10
Fig. 11
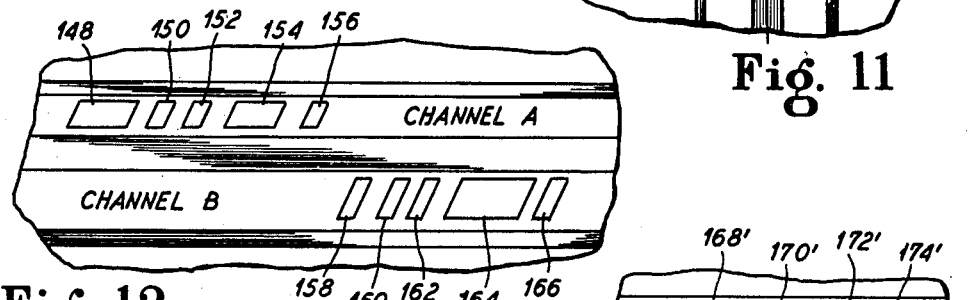
Fig. 12
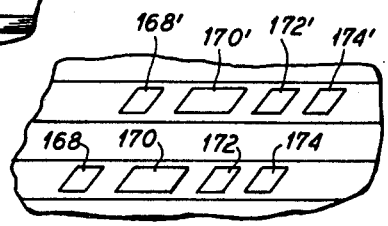
Fig. 13

MICROFICHE INFORMATION RETRIEVAL AND CONTROL SYSTEM UTILIZING MACHINE READABLE MICROFICHE AND VISUALLY READABLE MICROFICHE

CROSS REFERENCE TO RELATED APPLICATIONS

This application is related to our co-pending application, Ser. No. 922,798, filed July 7, 1978, now allowed.

BACKGROUND OF THE INVENTION

1. Field of the Invention

This invention relates to microfiche information retrieval techniques, and is more particularly concerned with the provision and retrieval of digital information on a microfiche card, which information is to be retrieved for data processing purposes in, for example, a parts management and inventory control system or in an accounts management and checking system.

2. Description of the Prior Art

It is well known in the art to provide control information on reel or cartridge or microfilm to identify frames along the length of the microfilm. This information may be in the form of alphanumeric characters which are visually read on a trial and error basis until the desired frame is properly positioned for reading in a viewer. It is also well known in the art to place control information along the edge of a strip of microfilm to be read by an optical scanner in order to place a desired frame within the viewing field of a viewer. It is also known in the art to mechanically address and position a microfiche transport, on an x-y basis, in order to register a desired frame of information within the viewing field of a viewer; however, mechanical techniques are expensive, and the expense increases with increased accuracy of registration.

With respect to microfiche cards used in parts management and inventory control systems, such as may be used in the retail, automotive and farm equipment industries, or accounts, credit check and signature card systems in the banking industry, a card is placed on an x-y transport, generally manually operated, and the desired frame is obtained, again by a trial and error method through repeated repositionings of the card until the desired frame appears on the viewer.

Heretofore, microfiche cards have been limited to providing, in conjunction with parts catalogues and the like, visually readable graphic illustrations and/or alphanumeric information, such as generally found in retail catalogue and parts ordering systems.

To generally sum up the state of the art, alphanumeric and digital codes have been provided on reel-type microfilm for visual or electronic observation, while microfiche cards have been provided with visual indicators to identify the position of a frame within a matrix of frames on a card.

SUMMARY OF THE INVENTION

The primary object of the present invention is to provide a management system for parts and accounts information retrieval.

A more specific object of the invention is to provide a microfiche information retrieval system which utilizes a data base which is easily and inexpensively up-dated.

Another specific object of the invention is to provide a new and improved parts management and inventory control system.

Another specific object of the invention is to provide a new and improved bank and credit account information checking system.

According to the invention, two basic types of cut microfiche, hereinafter simply called microfiche or microfiche cards, are provided as a data base. One type of microfiche card, called a "viewer microfiche", bears graphic information and digital information, the differences between such information being discussed below. In a parts management and inventory control system two types of viewer microfiche are provided:

(1) A "parts" microfiche which bears graphic information concerning parts, such as an exploded view of a pump or the like, and parts identification and location information; and
(2) A "master" microfiche which bears the manufacturer's part numbers and related system locator numbers.

The second type of microfiche is a totally digital microfiche which bears machine readable codes. More specifically, in a parts management and inventory control system (PMIC) the second type of microfiche is called a "price" microfiche and bears digital codes which indicate manufacturer's part number, locator number, current price and if the part is presently in stock.

The locator number may serve two purposes:

(1) Identify the correct price microfiche and provide an address for the information concerning the part being investigated; and
(2) Provide a physical location of the part in the dealer's warehouse.

The PMIC system and related banking and retail catalogue systems are based upon a concept disclosed in and claimed in our aforementioned co-pending application, having the following features:

(1) Microfiche cards bear digital information which may be of several types and may be employed in conjunction with graphic information;
(2) The digital information on a microfiche card may be employed in conjunction with an optical scanner for locating a certain area on the card, which area may contain digital or graphic information;
(3) The microfiche card, in conjunction with a scanner, locates a desired area to be scanned and adjusts the scanner or card transport, if necessary, with respect to skew so that the scanner and the information to be read are in accurate alignment; and
(4) Apparatus is provided for accurately locating a microfiche card with respect to a scanner, including structure for controlling operation of the scanner so as to detect positioning marks on the card which, after positioning, control the position of the card and/or scanner transport.

A microfiche card generally includes a header and a body. The header usually bears some type of text which identifies the card and its general content, while the body of the card bears the information sought to be retrieved. As has been indicated above, and as will be more fully appreciated from the detailed discussions below, the information to be retrieved may be graphic information or, according to the present invention, digital information.

More specifically, in a PMIC system, a master microfiche has a header comprising a sequential range of manufacturer part numbers and the body of the microfiche comprises the individual part numbers and the respective corresponding system locator numbers. The locator numbers may denote physical stock locations, as well as serve the primary function of identifying the corresponding price microfiche and addresses of the price microfiche inventory and price information.

A parts microfiche has a header which carries manufacturer model and part numbers, while the body bears graphic information concerning the parts, manufacturer part number, general descriptions of the parts, and corresponding locator numbers.

The price microfiche bears a price microfiche number on the header, while manufacturer number information and current sale price are carried on the body portion of the microfiche.

In banking and credit check applications, as will be understood from the detailed description below, a digital microfiche (corresponding to a PMIC price microfiche) may include account information in a machine readable form only, and may be accessed by appropriate addressing, such as by bank or credit card account number, and provide an account check in complete privacy from all persons, including the clerk or teller, as the case may be, who is seeking such information.

It should be noted that, as used herein, "digital information" is generally meant to identify marks, either opaque-on-clear or clear-on-opaque, while the term "graphic information" is generally meant to identify all other forms of information including alphanumeric information, drawings and the like. Also, contrasting colors may be used for digital and/or graphic information when such display is desired, such as for example in television applications.

In the context of a parts management and inventory control system, the present invention may advantageously be embodied in a system which comprises the aforementioned master, parts and price microfiche and apparatus for retrieving the information stored on such microfiche. In such a system, a viewer microfiche (master of parts) is positioned in a viewer, addressed and read to find a pertinent locator number which is assigned to a part being investigated. The locator number includes a price microfiche identification number to identify the pertinent price microfiche. The price microfiche is selected and placed in a scanner. Then, the locator number is keyed into the system to cause the scanner to access the price inventory information concerning that particular part. Finally, upon command, the price and inventory information is displayed by means of, for example, a light emitting diode (LED) display unit. If a sale or parts order is made, the system is provided with a printer for making a permanent record of the transaction and, in the case of an order, or a cancellation due to newly-received previously ordered parts, the transaction information is stored, at least on a temporary basis, for later communication to a central parts management computer. Such storage may advantageously be made with a magnetic tape unit and communicate to the central computer by way of the commercial telephone network by utilizing either a modulator-demodulator (MODEM) unit or a coder-decoder (CODEC) arrangement. All digital inter-unit and inter-network transmission may be accomplished with a specific digital code, such as the ASCII code.

A price microfiche, also called a "scanner" microfiche is intended to define a convenient, read-only, transportable, filable, data base constructed in standard microfiche form. The microfiche may bear written, graphic, audio or other information. The scanner microfiche may carry the information in digital or analog form and can be read with a scanner, transformed electronically to any desirable form, and can be displayed or used in any desired manner, or can be read with a TV camera and processed as a standard TV picture of signals. When the scanner microfiche is employed to provide data for another machine, (such as a computer) to accept and store, the entire microfiche may contain data only, an incremental encoding, as disclosed below, is not needed, except perhaps for initial alignment or periodic alignment purposes. A viewer microfiche is also a convenient, read-only, transportable, filable, data base in standard microfiche form. The information content may be written, graphic, audio, or other information. In contrast to the scanner microfiche, however, it is intended that the viewer microfiche have the information to be retrieved by projection onto a viewing screen.

With respect to the scanner microfiche, by using CON techniques, the present invention utilizes the possibility of generating, "printing" and distributing digital information at less expense and at greater speed than heretofore known. A particular advantage of all the microfiche cards used in the present invention is that information may be distributed, and up-dated, by mail, on an inexpensive basis, to provide a current inexpensive data base.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 is a fragmentary view of a portion of a master (viewer-type) microfiche:

FIG. 3 is a fragmentary view of a portion of a parts (viewer-type) microfiche;

FIG. 8 is a plan view of a portion of viewer microfiche card which has alignment and locating tracks in the grid between the viewable information frames;

FIGS. 9–11 illustrate scanning, alignment and frame-finding techniques which may be employed in conjunction with the viewer microfiche card of FIG. 8, including proper tracking, frame centering and frame cornering;

FIG. 12 illustrates the use of auxiliary codes on a viewer microfiche card;

FIG. 13 illustrates the use of redundant auxiliary codes on a viewer microfiche card.

DESCRIPTION OF THE PREFERRED EMBODIMENTS

Figure 1:
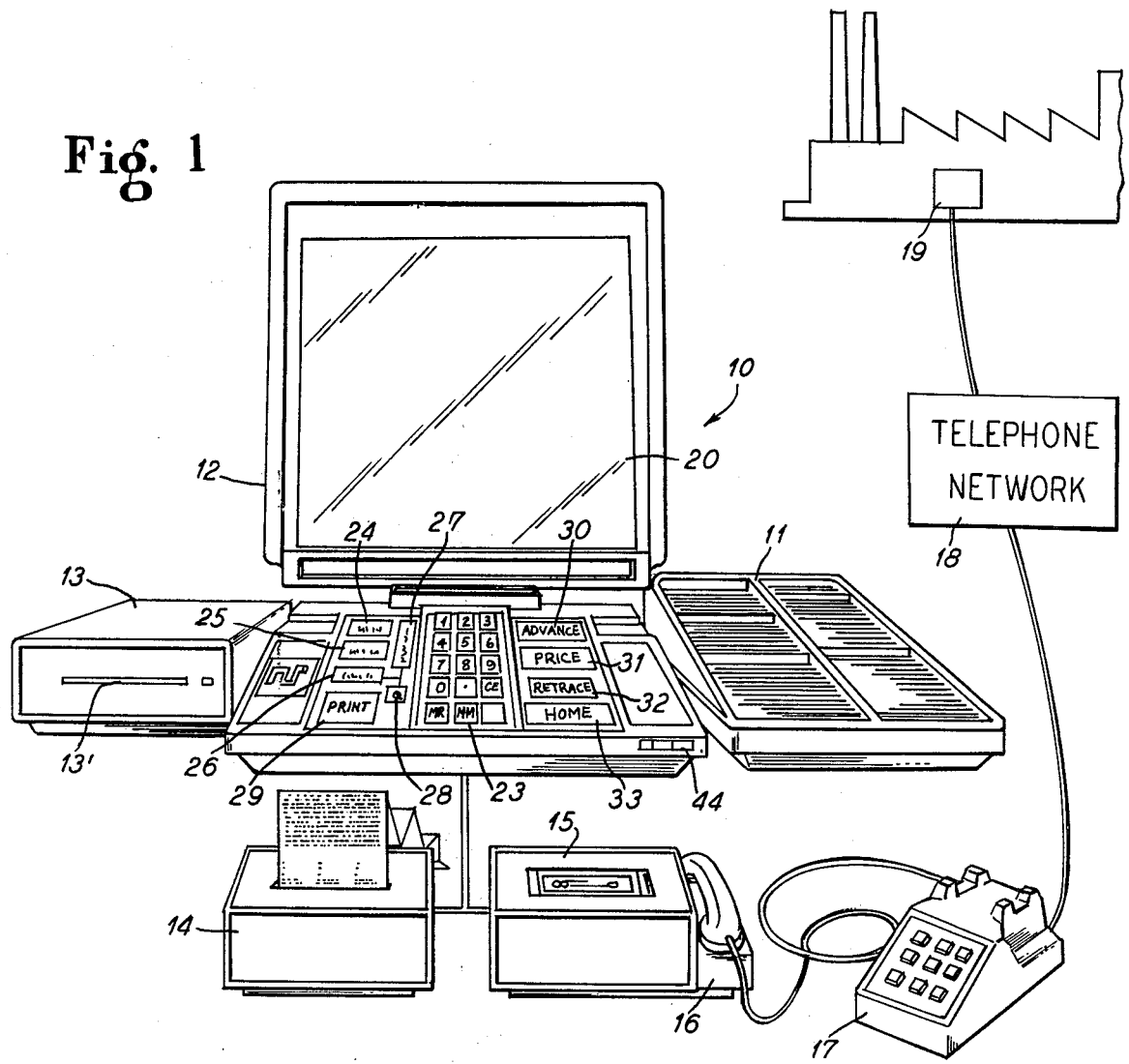
FIG. 1 is a schematic pictorial representation of a parts management and inventory control system constructed in accordance with the present invention.

Inasmuch as a plurality of different aspects of the invention are discussed below for accurately aligning and reading microfiche cards, these techniques will be discussed separately in accordance with the following outline.

I. GENERAL SYSTEMS CONCEPTS
  A. PMIC Systems Concepts
  B. Banking and Credit Check Systems Concepts
II. SCANNER MICROFICHE
  A. Control Data and Output Data
  B. Reading Scanner Microfiche
III. VIEWER MICROFICHE
  A. Tracking
  B. Stop At Frame Center
  C. Stop At Frame Corner
  D. Auxiliary Codes
  E. Reading Viewer Microfiche
  F. Exemplary Program
IV. COMBINED DIGITIZED AND VIEWER MICROFICHE INFORMATION RETRIEVAL
  A. Parts Management and Inventory Control Example
V. SINGLE MICROFICHE CONTROL SYSTEMS
  A. Banking and Credit Check Examples
  B. TV Applications
  C. Computer Program

I. GENERAL SYSTEMS CONCEPTS

A. PMIC Systems Concepts

The PMIC system was designed with an overall view of improving product or parts management and inventory control. More specifically, the PMIC system services seven areas which are critical to efficient parts management and inventory control, namely:

(1) parts are identified;
(2) prices are found rapidly;
(3) parts are retrieved quickly from stock with bin numbers provided by the system;
(4) records are made of the day's transactions;
(5) parts are ordered from a central location, preferably via a central computer;
(6) orders are fulfilled; and
(7) critical information such as availability, substitution and price change are kept up-to-date.

The importance of each of these areas become readily apparent when one considers the fact that a customer must be quickly serviced, the dealer must have complete records of his sales, orders and inventory, as well as up-to-date price and substitution information, and the central warehouse must be provided, not only with orders, but also with the fact that orders have been received and should not be carried as back-ordered parts.

B. Banking and Credit Check Systems Concepts

A customer's account may be checked, upon the presentation of a personal check or credit card, for example, by utilizing the account number to address a digitized scanner microfiche. The information read from the fiche may readily be converted into alphanumeric account identification and account status information and displayed on a LED unit, with complete privacy as to the name of the customer. In this manner, rapid credit checks can be made through the simple use of digitized microfiche cards, and a scanner which has an input keyboard and an output display unit. It is also possible to place bank account signature cards on viewer microfiche and key in the customer's account number so as to compare an endorsement or a withdrawal slip, for example, with the signature of the customer as seen on the viewer.

Inasmuch as the scanner microfiche, the viewer microfiche and information relating to proper alignment, addressing and tracking have been covered in our aforementioned co-pending application, the same information is provided immediately below so as to aid in understanding the present invention, the discussion of which will follow in connection with FIGS. 1, 1A, 2 and 3, with a reversion to FIGS. 7 and 14.

II. SCANNER MICROFICHE

Before continuing with a discussion of viewer-type microfiche, and because an operating program immediately follows the discussion of the viewer microfiche, attention is directed to FIGS. 4-7 which illustrate various techniques of manually-generated and COM-generated data, and techniques for ensuring alignment between the data to be retrieved and a sensor.

A. Control Data and Output Data

Figure 4:
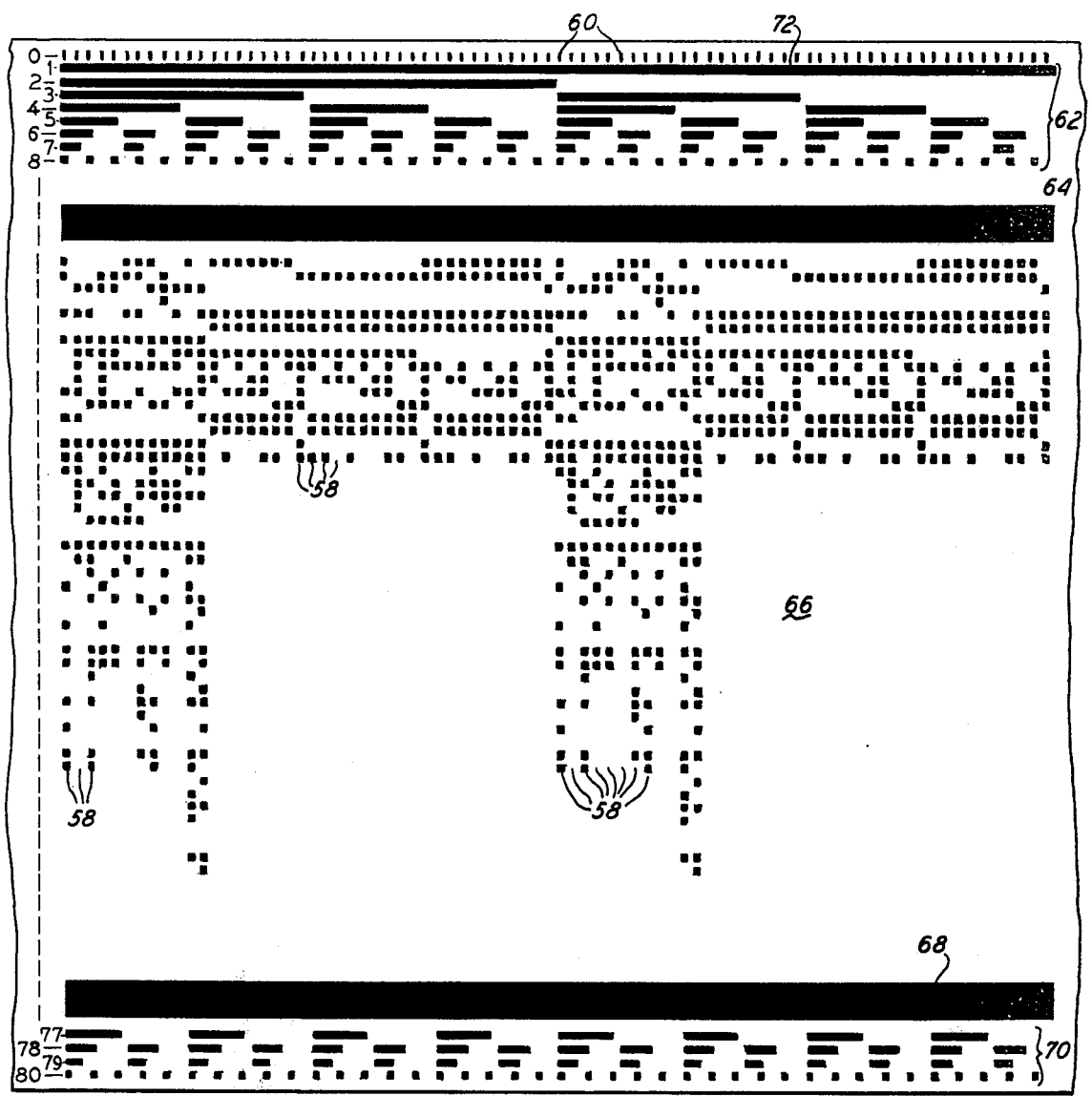
FIG. 4 is a plan view of a portion of a digitized scanner (price) microfiche which is illustrated in FIG. 5, the information illustrated thereon being hand-generated digital information.
Figure 5:
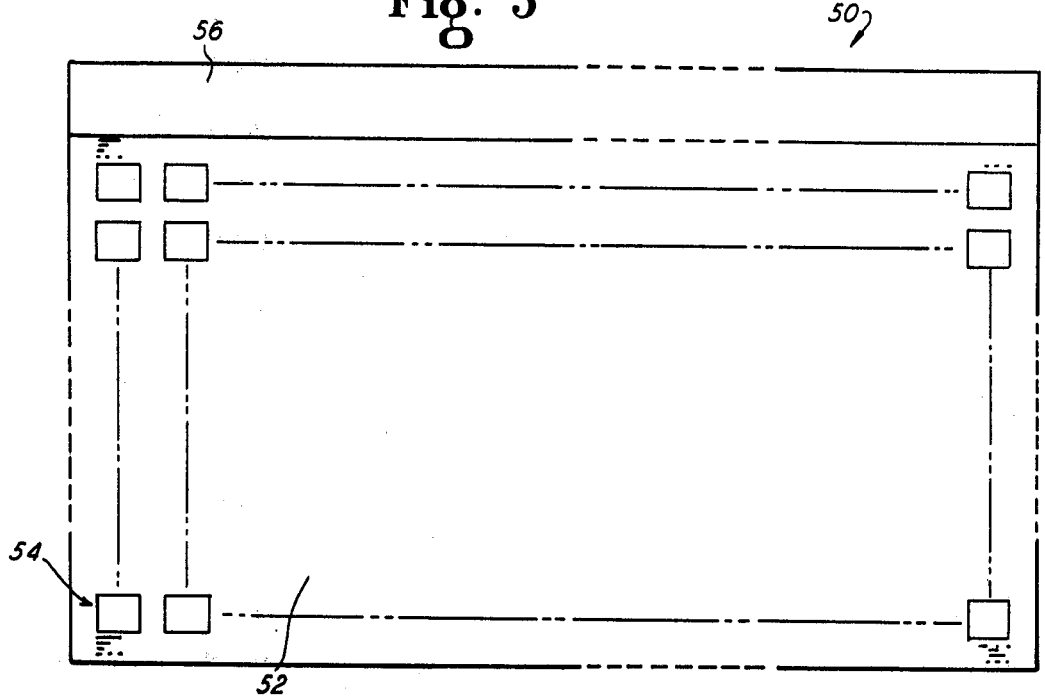

Referring first fo FIGS. 4 and 5, a microfiche card 50 is generally illustrated in FIG. 5 as comprising a body 52 composed of a plurality of information storage areas 54, and a header 56.

In the associated scanner apparatus, discussed in greater detail below, a linear photosensor is oriented transversely to the long dimension of the microfiche.

In apparatus which has been constructed, the sensor is placed in direct contact with the microfiche card. However, an optical system may be employed to project the microfiche images on a sensor. The use of an optical system is determined by the particular application.

The sensor may comprise a single continuous line of photocells fabricated as a single unit that spans the entire width dimension, 105 mm for example, of the microfiche card, or the sensor can be constructed of any number of segments, each segment containing a number of photocells, with the segments fabricated as a single unit that spans the entire 105 mm dimension of the microfiche card. The sensor can also be constructed of a single segment, or a number of segments, that span less than a full width of the microfiche card, or a matrix of cells which can sense a block of data, or a linear sensor in combination with a TV camera.

The light source that activates the sensor is located on the same side of a microcard as the sensor, whereas in microfiche applications the microfiche is located between the source and the sensor.

The entire sensor is moved left-to-right or right-to-left in the long direction of the microfiche. This is, of course, relative motion and in actual practice either the sensor or the card may be the moving element. As will be discussed below, logic circuits control the rate and mode of movement of the sensor.

As will be greatly appreciated by those skilled in the art, the sensor (or the transport) is mounted with a pivot, located at the upper end in the case of the sensor, and a device to move the bottom end of the sensor either left or right is provided to bring the sensor in complete alignment with a single vertical line of data that is to be read. The drives discussed herein with reference to block diagrams may advantageously with worm gear mechanisms and may utilize, for example, 2 DC servomotor manufactured by Transcoil, Inc., Part Number K-21-5540-3-2-6-3.

Referring to FIG. 4, a schematic illustration of a storage area 54 illustrates manually-generated information. Inasmuch as this sample was manually generated, continuous bars have been employed in portions of the coding. The same microfiche card can be generated by COM techniques, in which case the bars would not necessarily be continuous.

The example of a scanner microfiche card illustrates in FIGS. 4 and 5 contains all digital data and is not typical in the sense that all frames are identical and widely spaced.

In a practical scanner microfiche card of this type, centering marks, incremental encoding and start of data codes would be placed only at the top row of frames, and the end of data and bottom sensor alignment codes would be placed only at the bottom row of frames, these codes being shown in FIG. 4 on both sides of the area 54 to aid in understanding the invention. In a microfiche card of this type, there would be very little unused space.

Referring to the storage area 54 illustrated in FIG. 4, the data which is to be retrieved from the microfiche card are provided as opaque-on-clear or clear-on-opaque marks, here opaque-on-clear marks, in the form of rows of data 58 which are aligned transversely of the microfiche card. Again, contrasting colors can be used.

The card bears a plurality of centering marks 60, each of which is aligned with a respective data row 58. The microfiche card also carries incremental and coding data 62, a start of data code 64, the data field 66, and end of data code 68 and bottom sensor alignment codes 70.

With the exception that the end of data code 68 and the bottom sensor alignment codes 70 are actually provided physically displaced on the codes 60, 62 and 64 on a card, the card is laid out in a plurality of elongate data rows 0–80. It is the incremental encoding 62, however, which identifies and forms the addresses of the data rows 58.

Referring to FIG. 5, a storage area 54' is illustrated. This storage area is quite similar to that of FIG. 4, with the exception that the data field, generally indicated at 78, is COM-generated data. This data may also be manually generated. In addition, with this type of microfiche card, although the same may be employed in the same manner as that of FIG. 4, may be employed as a programming tool in which the data 78 is to be fed step-by-step into another machine, such as a microprocessor, computer or the like. In this case, since it is not necessary to access a particular row, the encoding and alignment codes may be provided to ensure alignment at the first data row, such as indicated at 74 and at some other or periodic point or points, such as illustrated at 76. The use of the encoding and alignment marks will be best understood from the following detailed description of reading a scanner microfiche card.

B. Reading Scanner Microfiche

When certain information is selected for retrieval, the logic circuits of the scanner apparatus cause the sensor to move across the microfiche card toward the selected data and the logic circuits remember the position of the sensor at all times.

The sensor first moves to the transverse column of frames within which the selected line of data is to be found. After locating the proper column of frames, the sensor advances until it detects the incremental code within that frame defines the address of the selected data. The sensor then moves ahead until it detects the centering mark for that selected incremental code. The centering mark ensures that at least the top of the sensor will be in alignment with the codes at the selected address.

The logic circuits now compare bits 5–8 of the incremental code in the top longitudinal rows to bits 77–80 in the bottom longitudinal rows. If these bits do not correspond, bit for bit, the sensor is rotated in the proper direction, as determined by the logic circuits that compare the bits, to achieve alignment with the entire selected transverse data row 58.

When the bits 5–8 correspond, bit for bit, with the bits 77–80, the sensor has achieved alignment with the selected transverse data row. As previously mentioned, the sensor is pivotally mounted; however, in the alternative the transport may be pivotally mounted.

The sensor is now operated to scan the data transversely of the row aligned therewith and makes use of the information codes that are between the start of data code and the end of data code. Any portion of the data between the start of data code and the end of data code may be used, or ignored, as controlled by the logic circuits.

Figure 7:
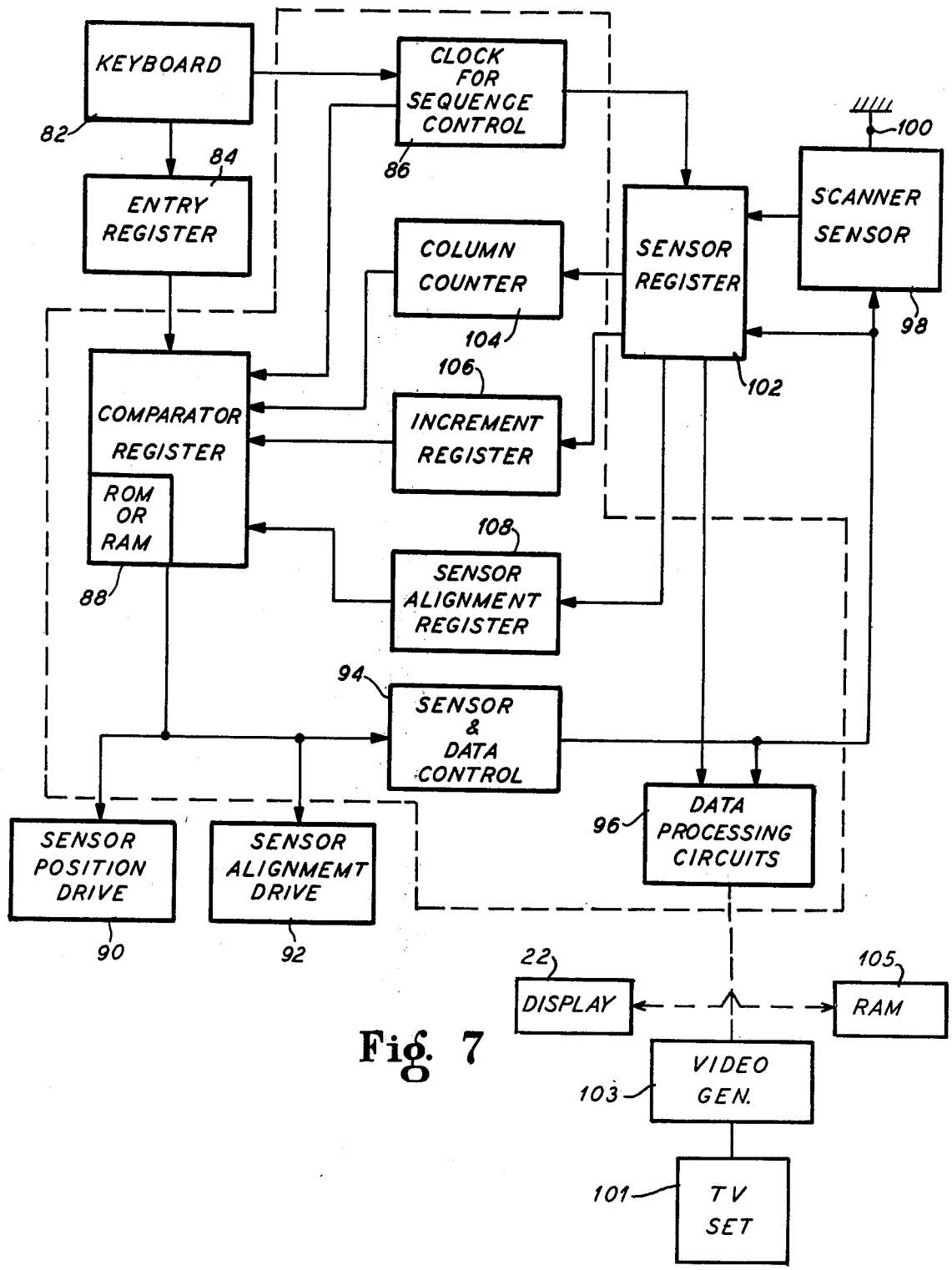
FIG. 7 is a schematic block diagram of a system for aligning and reading a microfiche card of the type illustrated in FIGS. 4–6, with a scanner sensor.

Referring now to FIG. 7, a more detailed discussion of access and alignment will be given for the scanner microfiche card. In FIG. 7 a keyboard 82 is provided for the user to enter a desired address and an activating order. The keyboard may be a scanned type arrangement as is common in the art, or may be constructed using, for example, a MOSTEK MK 50311 N four function calculator circuit, the necessary additional switches (PRICE, etc.) and a keyboard integrated circuit such as the S 9262 touch control interface manufactured by American Microsystems, Inc. The address is fed to and held in an entry register 84 and the activating order is fed to a lock 86 for sequence control. The clock 86 is also connected to other elements than illustrated in the drawing, which connections have been omitted for the purpose of clarity, the same being understood to those skilled in the art.

After an address has been entered and an activating order given, a column counter 104 and a comparator register 88 determine which direction to drive the sensor to the selected column.

After the sensor has found the selected column, the sensor steps ahead until the incremental code it reads compares bit-for-bit with the selected address, then the sensor is stepped ahead in smaller increments until the centering mark of the desired column is detected. The sensor then stops.

It should be noted that the sensor 98 may count any one of the bars, such as the bar 72 to determine the proper frame, and the remainder of the marks of the code, for example, the longitudinal bars in rows 1–8 may be counted to determine the proper transverse row 58.

The incremental code and the sensor alignment code, both being identical, are compared in the comparator register 88 and the sensor 98 is pivotally adjusted, as indicated at 100, so that the codes compare bit for bit.

The entire vertical line of data, that is a data row 58, is now scanned and abstracted or used by the data processing circuits 96 for output to circuits which are to utilize the digital information.

The column counter 104 keeps track of the column in which the sensor is positioned. The increment counter selects the address out of the scanned data, and the sensor alignment register selects sensor alignment codes from the scanned data to control positioning of the sensor. The sensor position drive and the sensor alignment drive area elements which are well known in the art.

The entire circuit outlined in the broken line may be configured from a microprocessor of the type Motorola MC 6800 P or the Intel 8080 series, while the sensor register 102 may be formed of any standard well known register and the sensor 98 may be constructed from a well known device, such as the Fairchild CCD 17280. As already mentioned, the keyboard 82 and the entry register 84 are also devices which are well known to those skilled in the art.

It should be noted that the comparator register includes a portion identified ROM or RAM, for a read only memory (ROM) or a random access memory (RAM). This is because the microprocessor may include a ROM in which the program is "wired" in. With the aforementioned Motorola device, however, we selected a RAM and it is necessary to feed in a program when the power to the unit is turned on. As will be evident from the discussion below with respect to the viewer microfiche and the program for reading the viewer microfiche, programming of a RAM in a microprocessor or a "wired-in" program for a ROM is well within the skill of those versed in this art.

III. VIEWER MICROFICHE CARD

The viewer microfiche card is generally illustrated at 110 in FIG. 8 as comprising a plurality of frames 112 formed in a matrix and having spaces between the frames which are scanned by a sensor 114 which is positioned, for example at 45° with respect to the directions of movement of the microfiche card. In the spaces between the frames 112 a plurality of tracking lines 116, 118, 120 are provided in the longitudinal direction of the card and a plurality of tracking lines 122, 124 and 126 are provided in the transverse direction of the microfiche card.

The tracking and code system described herein is one selected for certain of our test purposes, and represents only one of many configurations this scheme can take while still providing the necessary tracking and coding functions.

As illustrated in FIG. 8, the tracking lines 116–126 are not in the viewing areas and are placed on the microfiche card in precise positions relative to the graphic information within the viewing areas 112.

When this microfiche card 110 is employed in a viewer, the lines are projected on the sensor 114 out of the viewing area. The sensor 114 may be constructed of approximately 40 individual photocells and is used to detect the lines and other data. The sensor 114, as mentioned above, is positioned at 45° to the tracking lines to allow a single sensor to detect both vertical and horizontal tracking lines, although two sensors at right angles to the tracking lines could be utilized to perform as well.

The tracking lines may be either clear lines with a black background, or vice-versa. We have planned to use clear lines with a black background; however, the system will work either way.

A. Tracking

Referring to FIG. 9, when the sensor is positioned with respect to the tracking lines 116, 118, 120, as illustrated at 114, all three tracks are sensed, and the microfiche card is in the correct vertical "tracking" position for accessing or viewing. If the sensor is in the position illustrated at 114', however, the pattern of photocells sensing the tracks allows the logic circuits to determine the direction the microfiche must be moved to bring the sensor back to the relative position of that illustrated at 114. In the alternative, if the sensor is in the position illustrated at 114', the pattern of sensing photocells will allow the logic circuits to determine that the microfiche card must be moved vertically in a direction opposite to that to correct for the position 114'.

With the 45° orientation of the sensor 114, or two sensors oriented at 90°, the tracking scheme permits the vertical tracking lines 122, 124 and 126 to be followed in the same manner.

The tracking technique amounts to a dynamic, or feedback, registration system.

The sensor 114 and tracking line position can also be used to provide proportional control. That is, any misalignment, greater than a single cell of the sensor, with respect to the tracking lines, will produce an error signal that can be used to correct the microfiche card position.

B. Stop at Frame Center

Referring to FIG. 10, the tracking lines described above allow for moving the microfiche card in a precise matrix or grid pattern in order to automatically access single or partial frames from a microfiche card.

In order to stop at the proper location to allow a frame to be viewed, a frame center code, for example the code marks 124, 126 and 128 is placed between two of the tracking lines, for example the tracking lines 118 and 120, while a frame center bar is placed between both the top and middle, and the middle and bottom tracking lines, that is between the tracking lines 116 and 118, and between the tracking lines 118 and 120, here illustrated in the form of two marks 130 and 132. In FIG. 10 the reference 114 diagrammatically illustrates the center line of the sensor, while the line 122 diagrammatically illustrates the center line of the frame. With this coding, there are two channels, Channel A and Channel B provided in which the frame center code is located in Channel B and the frame center bar is located in Channels A and B. The frame center code corresponds to the address of the frame in the horizontal direction.

The microfiche card is moved in a direction such that the relative motion of the sensor is left to right in FIG. 10. As the sensor 114 passes over the frame center code marks 124, 126, 128, the sensor detects the three bits of the frame center code, which the logic circuits interpret to mean that the microfiche is to stop when the sensor detects the bit between the upper tracking line 116 and the middle tracking 118, that is in Channel A and the bit between the middle tracking line 118 and the bottom tracking line 120, which is in Channel B.

C. Stop at Frame Corner

Referring to FIG. 11, a corner of a frame may be detected in a manner similar to that discussed above with respect to FIG. 9. The tracking lines 116, 118, 120 and the tracking lines 122, 124, 126 generally come together at the corner of each frame. Therefore, in the longitudinal direction there is still a Channel A and a Channel B, while in the transverse direction there is a Channel AV and a Channel BV. A plurality of frame corner cord markings 126, 128 are provided in the Channel B and a plurality of frame corner code markings 140, 142 are provided in the Channel BV, while a frame corner bar is provided in Channel A and Channel B, as illustrated at 144, 146. In FIG. 11, the sensor, again symbolically illustrated at 114, detects the two frame corner codes 136, 138 as it passes thereover. The logic circuits then cause the transport to stop the motion when the frame corner bar 144, 146 is detected.

If downward vertical (transverse) motion is required after reaching a frame corner bar, the sensor 114 would be inhibited for a specific time and move downward. The time of inhibition is selected such that at the rate of motion utilized, the sensor would stand across all three vertical tracking lines before becoming active again. After becoming active, the sensor will "track" the vertical lines to its next point of action.

The logic program may ignore frame center codes and/or frame corner codes and/or any other codes that it may detect during travel along the tracking lines, until a selected point is reached. The distance between the points is measured, for example, by the rate of transport and by the time of transport.

D. Auxiliary Codes

Referring to FIG. 12, codes other than frame center codes, frame corner codes and frame corner and centers bars may be placed within any of the tracking lines in Channel A and/or Channel B. For example, in FIG. 12, Channel A includes a code which is provided by the marks 148, 150, 152, 154 and 156, while in Channel B a code is provided with the marks 158, 160, 162, 164 and 166. These codes may be used for an infinite number of purposes, such as frame numbering, frame content designation, branch designation, sound track selection (when used with a complementary audio component), access address to a scanner, and so on. As illustrated in FIG. 12, the codes may be placed in either one or both of the channels.

For extreme reliability requirements, redundant codes may be utilized, as illustrated in FIGS. 12. It will be noted that in Channel A there is a code provided by the markings 168', 170', 172' and 174' which is redundant with the code provided by the markings 168, 170, 172 and 174 in Channel B. For added reliability, a parity scheme will be used in addition to redundancy.

Although it has not been mentioned above, it should be readily apparent that all codes, including frame center codes and frame corner codes may take on an infinite variety of forms.

E. Reading Viewer Microfiche Card

Figure 14:
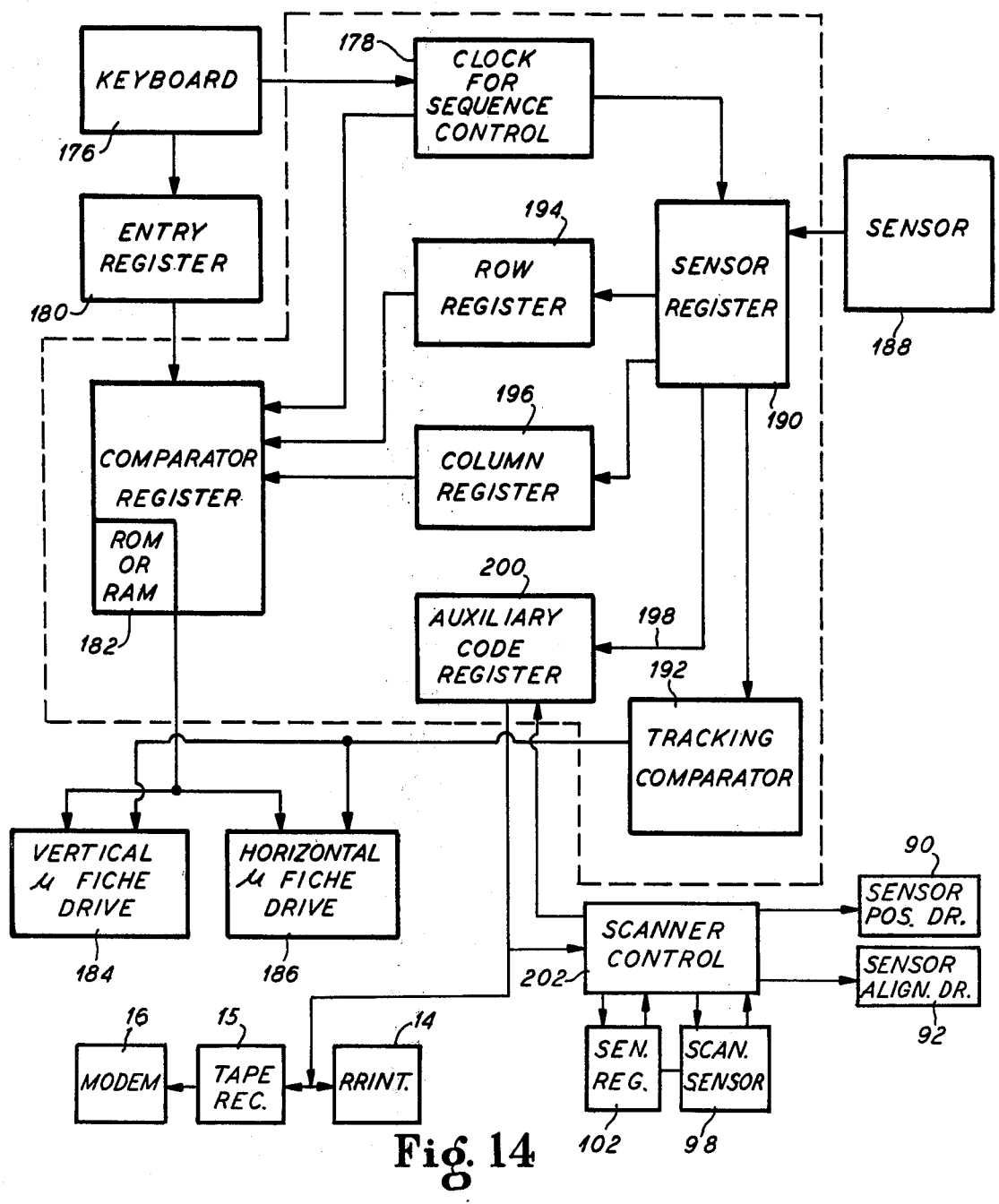
FIG. 14 is a schematic block diagram of a system for transporting and accurately positioning a viewer microfiche card for subsequent viewing, and for controlling and reading a scanner (price) microfiche.

Referring to FIG. 14, a system and a method for positioning a viewer microfiche card for reading is illustrated in which the apparatus comprises a keyboard 176 and an entry register 180 which are the same as similar elements illustrated in FIG. 7. The user keys in a desired address and an activation order, the address being deposited in the entry register 180 and the activation order being forwarded to the block 178 for sequence control. Again, the clock is illustrated as being connected only to certain components, while clock connections to other components have been omitted for purpose of simplicity.

After activating, the row register 194, via the comparator register 182, determines the vertical and horizontal direction in which the microfiche must be moved in order to bring the selected frame into the viewing position. The microfiche moves either vertically or horizontally, never diagonally in this system.

The tracking comparator 192 is fed by the sensor 188 by way of the sensor register 190 and compares the track position with a standard track position and controls the horizontal and vertical microfiche drives 186 and 184, respectively, to maintain tracking as discussed above so that the sensor extends over all three tracking lines in the particular direction which the microfiche is bring driven.

The sensor register provides an output 198 as the data output, which output may have interposed therein an auxiliary code register 200 which reads the auxiliary codes, such as are illustrated in FIGS. 11 and/or 12.

The sensor 188 may be a 40 or 60 element sensor of the type discussed above. The vertical and horizontal drives 184 and 186, as well as the keyboard 176 and 180 are well known to those skilled in the art, while the elements bounded by the broken line may be a conventional microprocessor, such as the Intel 8080A or the Motorola MC6800P. As with the apparatus of FIG. 7, the comparator register 182 includes a ROM or a RAM section for storing the program. In a particular device constructed and utilized we have employed the Motorola MC6800P microprocessor with a RAM section so that it was necessary to feed in the program each time the system was energized.

F. Exemplary Program

The following is an exemplary program for accurately positioning a viewer microfiche, or more importantly a desired portion of a viewer microfiche, with respect to a viewer. It should be understood by those versed in this art that a similar program, although a simpler program, may be employed in connection with the apparatus of FIG. 7 for accurate alignment of a data row 58 (FIGS. 4–6) in that the scanner microfiche is generally only operated by movement of the sensor (or transport) in a single direction, in addition to correction of skew by the pivoting of the sensor or the transport, and in connection with the additional apparatus of FIG. 14 which relates to reading with the scanner.

| SYSTEM MONITOR | | | |
|---|---|---|---|
| 21D BD | MONITR: | JSR | Set up peripherals |
| 00 | | | for first move |
| 00 | | | Move to upper left corner |
| 220 86 | HOME: | LDAA #$3C | Select verimotor up |
| 3C | | | (Horiz. motor already selected left |
| 222 B7 | | STAA PIACRB | |
| 80 | | | |
| 07 | | | |
| 225 86 | | LDAA #$FF | Both motors full |
| FF | | | speed ahead |

| SYSTEM MONITOR | | | |
|---|---|---|---|
| 227 87 80 06 | | STAA PIAORB | |
| 22A 20 FE | GO: | BRA GO | Wait here while user resets and engages microswitches at end of move |
| 22C BD 00 | | JSR INIT | Reinitiate PIA's after manual reset |
| 22F 86 02 | STRIPSN: | LDAA #$04 | Routine to move to frame 01 start position at left end of horizontal guidebar |
| 231 BD 05 | | JSR BAKHOM | |
| 234 20 37 | | BRA INITFRAME | Initiate frame pointer to 01 |

| ROUTINE TO SCAN DATA OF ARRAY FOR POSITION AND SIZE OF ALL VALID FEATURES | | | |
|---|---|---|---|
| 246 BD 00 1E | SCAN: | JSR SRCH | Get first feature |
| 249 CE 00 00 | | LDX #$00 | Initialize feature array index |
| 24C DF F3 | | STX CODEPTR | Save it |
| 24E 96 F2 | NEXFEAT: | LDAA LITCNT | Feature there? |
| 250 2F 17 | | BEQ END | No - end of scan |
| 252 D6 F4 | | LDAB CODEPTR+1 | Check for more than features, to protect program from being written over |
| 254 C1 08 | | CMPB #$08 | |
| 256 2E 11 | | BGT END | If more than five, out of focus - Go to re-read program |
| 258 A7 F7 | | STAA CODETABL+1,X | Yes - Store its size in array, then store its position |
| 25A 96 F1 | | LDAA FEATSTRT | |
| 25C A7 F6 | | STAA CODETABL,X | |
| 25E 08 | | INX | Update pointer for next feature |
| 25F 08 | | INX | |
| 260 DF F3 | | STX CODEPTR | Save it again |
| 262 BD 01 00 | | JSR XTRACT | Extract next feature |
| 265 DE F3 | | LDX CODEPTR | Retrieve pointer |
| 267 20 E5 | | BRA NEXFEAT | -Go again |
| 269 39 | END: | RTS | |
| 26A 00 00 00 | | | |
| 26D 86 01 | INITFRAME: | LDAA #$01 | |
| 26F 97 E2 | | STAA PRESFRAME | Present frame = 01 |

User sets breakpoint
to key in desired
next frame
↓

| | | | |
|---|---|---|---|
| 271 BD 02 C5 | ROUTE: | JSR NINES | Routine to calc, route to next frame - first convert next frame input to row and column format |
| 274 96 E1 | | LDAA NEXFRAME | To complete final hor. motion use col. number of next frame (lower half-byte) to index a table indicating closest vert. bar to final row number |
| 276 84 0F | | ANDA #$0F | |
| 278 B7 02 7F | | STAA HERE | |
| 27B CE 02 BB | | LDX ROUTEABL | x contains base address of table |

ROUTINE TO SCAN DATA OF ARRAY FOR POSITION AND SIZE OF ALL VALID FEATURES

| | | | |
|---|---|---|---|
| 27E E6 00 | HERE: | LDAB O,X | Load address of vertical bar into ACCB |
| 280 D7 A9 | | STAB HORZ | Final hor. motion completed as (NEXFRAME - Vertical) |
| | | |       Hor      Bar Address |
| | | |       ↑      ↑ |
| | | |     ACCA    ACCB |
| 282 90 A9 | | SUBA HORZ | |
| 284 97 A9 | | STAA HORZ | Result is neg. for motion to left, pos. for right |
| 286 96 E2 | | LDAA PRESFRAME | Calc. first hor. motion (present frame vert. bar) |
| 288 84 OF | | ANDA #$OF | |
| 28A 97 A7 | | STAA HOR1 | As (Vert. bar PRESFRAME) |
| | | |     address    hor. |
| | | |     ACCB    ACCA |
| 28C DO A7 | | SUBB HOR1 | |
| 290 OO OO OO OO | | | |
| 294 96 E2 | | LDAA PRESFRAME | Next, fetch row number of present frame into lower half-byte of ACCA with zeros in upper half-byte |
| 296 48 | | ASLA | |
| 297 48 | | ROLA | |
| 298 49 | | ROLA | |
| 299 49 | | ROLA | |
| 29A 49 | | ROLA | |
| 29B D6 E1 | | LDAB NEXFRAME | And same for row number of next frame in ACCB |
| 29D 58 | | ASLB | |
| 29E 59 | | ROLB | |
| 29F 59 | | ROLB | |
| 2AO 59 | | ROLB | |
| 2A1 59 | | ROLB | |
| 2A2 84 OF | | ANDA #$OF | Mask out upper half-bytes |
| 2A4 C4 OF | | ANDB #$OF | |
| 2A6 D7 A8 | | STAB VERT | Vet. motion computed as (PRESFRAME - NEXFRAME) |
| | | |     Vert.    Vert. |
| | | |     ↑    ↑ |
| | | |     ACCA    ACCB |
| 2A8 90 A8 | | SUBA VERT | |
| 2AA 97 A8 | | STAA VERT | POS. = UP NEG. = DOWN |
| 2AC 26 09 | | BNE DONE | Any vertical motion required? |
| 2AE 96 A7 | NOVERT: | LDAA HOR1 | No - Combine HOR1, HORZ into single horizontal motion and store in HOR1 |
| 2BO 9B A9 | | ADDA HORZ | |
| 2B2 97 A7 | | STAA HOR1 | |
| 2B4 7F 00 A9 | | CLR HORZ | No need for HORZ |
| 2B7 7E 03 08 | DONE: | JMP NEXMOVE | ready to start move to next frame |
| 2BB | ROUTETABLES | | Gives frame address of vertical route to be taken for destination frame whose column number is: |
| | | | ↓ |
| 2BC 01 | | | 1 |
| 02 | | | 2 |
| 03 | | | 3 |
| 04 | | | 4 |
| 05 | | | 5 |
| 06 | | | 6 |
| 07 | | | 7 |

ROUTINE TO SCAN DATA OF ARRAY FOR POSITION AND SIZE OF ALL VALID FEATURES

| | | | |
|---|---|---|---|
| 08 | | | 8 |
| 2C4 09 | | | 9 |
| | | | Routine to convert between decimal and row-column format for frame numbers |
| 2C5 96 E1 | NINES: | LDAA NEXFRAME | ACCA gets converted |
| 2C7 81 19 | | CMPA #$19 | Is ACCA in row 1 or row 2? |
| 2C9 2D 03 | | BLT 1 or 2 | Yes - Branch around |
| 2CB 7E 01 E1 | | JMP PATCH 6 | No - Continue checking |
| 2CE 81 10 | 1 or 2: | CMPA #$10 | No - is ACCA in row 1 |
| 2D0 2C 03 | | BGE .+3 | No - Branch around |
| 2D2 7E 05 E7 | | JMP LAST | Yes - No conversion required |
| 2D5 C6 01 | .+3: | LDAB #$01 | ACCB = Conversion amount = ±1 for row 2. |
| 2D7 7D 00 A5 | DECIDE: | TST CONVRT | Which direction is conversion desired? |
| 2DA 7E 05 D3 | | JMP PATCH 9 | Go find out |
| 01E1 81 30 | PATCH 6: | CMPA #$30 | Is ACCA in bottom row? |
| 1E3 2E 05 | | BGT BOTTOM | Yes - Branch around |
| 1E5 C6 02 | | IDAB #$02 | Convert by adding ±2 for row 3 |
| 1E7 7E 02 D7 | | JMP DECIDE | Go decide on conversion desired |
| 1EA C6 D0 | BOTTOM: | LDAB #$−30 | For bottom row, subtract ±30 to convert |
| 1EC 7E 02 D7 | | JMP DECIDE | -Go do it |
| 5D3 27 06 | PATCH 9: | CONVERT | If decimal to row/col. desired, do addition |
| 5D5 50 | | NEGB | If row/col. dec. desired, do subtraction |
| 5D6 81 19 | | CMPA #$19 | If, row 1, col. 9, then special case - only subtract 1 instead of 2 |
| 5D8 26 01 | | BNE CONVERT | |
| 5DA 4C | | INCA | Add 1 to compensate |
| 5DB 1B | CONVERT: | ABA | Preform conversion here (add ACCB to ACCA) |
| 5DC 7E 03 | | JMP PATCH 10 | Check for special decimal conversions of 19→21 or 21→19 |
| 5DF 7D 00 A5 | STORE: | TST CONVERT | Should result be stored in NEXFRAME? (convrt = 0) |
| 5E2 26 03 | | BNE LAST | No - Branch around |
| 5E4 97 E1 | | STAA NEXFRAME | Yes - Store it |
| 5E6 00 | | | |
| 5E7 7F 00 A5 | LAST: | CLR CONVRT | -Auto clear flag (conversion is decimal→row/col. by default) |
| 5EA 39 | | RTS | -All done |
| 3A0 C6 06 | PATCH 10: | LDAB #$06 | Load decimal adjust term |
| 3A2 81 1B | | CMPA #$1B | Does conversion result equal 1B (19+2)? |
| 3A4 27 05 | | BEQ ADD | Yes - ADD decimal term, next |
| 3A6 50 | | NEGB | No - Negate decimal term for next test |
| 3A7 81 1F | | CMPA #$1F | Does conversion result = 1F (21-2) |

ROUTINE TO SCAN DATA OF ARRAY FOR POSITION AND SIZE OF ALL VALID FEATURES

| Address | Label | Instruction | Comment |
|---|---|---|---|
| 3A9 26 01 | | BNE BACK | No - don't adjust |
| 3AB 1B | ADD: | ABA | Yes - add decimal term |
| 3AC 7E 05 DF | BACK: | JMP STORE | Now go decide whether to store conversion result |
| | | | Subroutine to search and lock onto a hor. guidebar |
| 2E0 96 DB | FINDBAR: | LDAA MINBAR | |
| 2E2 97 B0 | | STAA BARTIME | Load converter with min. time to establish a valid bar |
| 2E4 D6 AC | REFIND: | LDAB OUTVIEW | Which direction is search desired? (outview = 0 for up, 1 for down) |
| 2E6 27 04 | | BEQ FARLEFT | |
| 2E8 86 34 | | LDAA #$34 | Down - Select vertical DIA down |
| 2EA 20 02 | | BRA .+2 | |
| 2EC 86 3C | | LDAA #$30 | Select med. vertical search speed |
| 2F0 B7 80 07 | | STA PIACRB | |
| 2F3 F7 80 06 | | STAB PIAORB | Start motor |
| 2F6 80 00 1E | LOOK: | JSR SRCH | Scan present input data for guidebar |
| 2F9 96 F2 | | LDAA LITCNT | If found, LITCNT will be 0 |
| 2FB 27 E3 | | BEQ FINDBAR | If not, reset bartime and try again |
| 2FD 7A | | DEC BARTIME | When found, advance timer |
| 300 96 B0 | | LDAA BARTIME | Min. Time expired? |
| 302 26 F2 | | BNE LOOK | No - keep timing |
| 304 7F 80 06 | | CLR PIAORB | Yes - bar found stop motor |
| 30F 39 | | RTS | Return to caller |

PERFORMS NEXT HOR. MOVE:

| Address | Label | Instruction | Comment |
|---|---|---|---|
| 320 96 A7 | HORIZONTAL: | LDAA HOR 1 | What kind of move is required? |
| 322 27 4B | | BEQ HALT | None - up date frame pointers and to back for user input |
| 324 2B 0A | | BMI LEFTMOVE | Left - branch here |
| 326 86 3C | | LDAA #$3C | Right - Select direction = right |
| | | | DETERMINES NEXT MOVE |
| 308 BD 03 20 | NEXMOVE: | JSR HORIZONTAL | Do first hor. move |
| 30B 96 A8 | | LDAA VERT | Any vert. motion required? |
| 30D 27 0A | | BEQ DEST | No - at destination, update frame pointer |
| 30F BD 03 B0 | | JSR VERT | Yes - do vert. move |
| 312 96 A9 | | LDAA HORZ | Prepare for further hor. move if necessary |
| 314 97 A7 | | STAA HOR1 | |
| 316 BD 03 20 | | JSR HORIZONTAL | Then do it |
| 319 96 E1 | DEST: | LDAA NEXFRAME | |
| 31B 97 E2 | | STAA PRESFRAME | New source in old destination |
| 31D 7E 05 23 | | JMP CODES | Go read codes at destination |

ROUTINE TO SCAN DATA OF ARRAY FOR POSITION AND SIZE OF ALL VALID FEATURES -continued

| Address/Code | Label | Instruction | Comment |
|---|---|---|---|
| 328 7C<br>00<br>A7 | | INC HORI | Add in a dummy move so initially finding guidebar is not counted as a frame when moving right. |
| 32B 97<br>DA | | STAA HORDIR | Store direction data |
| 32D 7E<br>01<br>BD | | JMP IGNR | Jump away from codes to find guidebar |
| 330 86<br>34 | LEFTMOVE: | LDAA #$34 | Store DIRECTION = LEFT (No dummy move required since initially guidebar is advancing to next frame when left |
| 332 97<br>DA | | STAA HORDIR | Store direction |
| 334 20<br>20 | | BRA PREPULS | Determine whether long or short pulse is necessary, then do it |
| 336 86<br>FF | IGNORE: | LDAA #$FF | Routine to pulse through intermediate codes: |
| 338 97<br>F5 | | STAA PULSTIM | Use max. pulse width |
| 33A 96<br>DA | | LDAA HORDIR | Select proper direction |
| 33C C6<br>08 | | LDAB #$08 | Select med. hor. speed |
| 33E BD<br>01<br>F0 | | JSR PULSE | Do the pulse |
| 341 39 | | RTS | ;Back to caller |
| 0342 BD<br>03<br>344 70 | REGET: | JSR REGISTER | ;Now refind guiebar for next frame |
| 347 96<br>A7 | | LDAA HOR1 | Update frame counter |
| 349 2B<br>03 | | BMI INCR | In which direction? |
| 34B 4A<br>34C 20<br>01 | DECR: | DECA<br>BRA .+1 | -Down if positive |
| 34E 4C<br>34F 97<br>A7 | INCR: | INCA<br>STAA HOR1 | -Up if negative<br>Store it |
| 351 27<br>15 | | BEQ STOP | All done if count is zero |
| 353 BD<br>00<br>53 | | JSR CENTER | Now guide along bar to move along next frame |
| 368 86<br>34 | STOP: | LDAA #$34 | Select direction = left |
| 36A 97<br>DA | | STAA HORDIR | |
| 36C BD<br>00<br>53 | | JSR CENTER | Guide left along bar to have position at left edge |
| 36F 39 | HALT: | RTS | Return to monitor for next move |
| 356 96<br>E1 | PREPULS: | LDAA NEXFRAME | ;Start calc. trigger<br>;Frame for long code ignore pulse |
| 358 D6<br>DA | | LDAB HORDIR | ;Which direction are we going? |
| 35A C1<br>34 | | CMPB #$34 | ;If left, HORDIR = 34 |
| 35C 27<br>01 | | BEQ .+1 | ;If left, trigger frame = present frame (Do not increment to next frame) |
| 35E 4C | | INCA | ;If right, trigger frame = next frame |
| 35F 90<br>A7 | | .+1: SUBA HOR1 | ;Calc. present horizontal ;position to check if at trigger ;frame (= NEXTFRAME-HOR1) |
| 361 7E<br>01<br>C0 | | JMP PATCH 3 | ;Now finish calc. check ;for doing the long pulse, and ;pulse around the codes |

THIS PATCH DETERMINES WHETHER FICHE IS GOING TO JUMP OVER TO RIGHTMOST COLUMN (COL.9) AND IF NOT GOES AHEAD AND DOES A

-continued

ROUTINE TO SCAN DATA OF ARRAY FOR POSITION AND SIZE OF ALL VALID FEATURES

LONG PULSE TO GET OVER CODES (IF COL. 9,
LONG PULSE WOULD RUN INTO MECHANICAL STOP

| | | | |
|---|---|---|---|
| 1C0 00 | PATCH 3: | | ;Frame number after this jump |
| 00 | | | ;is already in ACCA |
| 00 | | | |
| 00 | | | |
| 00 | | | |
| 1C5 84 | | ANDA #$0F | ;Select column from |
| 0F | | | ;frame number |
| 1C7 81 | | CMPA #$09 | ;Is it right most column? |
| 09 | | | |
| 1C9 27 | | BEQ IGNR | ;If so, do a short jump |
| 10 | | | ;only |
| 1CB 00 | | | |
| 00 | | | |
| 00 | | | |
| 00 | | | |
| 1CF 86 | | LDAA #$01 | ;Initialize a counter to |
| 01 | | | ;do 1 pulse |
| 1D1 97 | | STAA PULSNMR | |
| D4 | | | |
| 1D3 BD | MORE: | JSR IGNORE | ;Do the pulse |
| 03 | | | |
| 36 | | | |
| 1D6 7A | | DEC PULSNMR | ;Count it off |
| 00 | | | |
| D4 | | | |
| 1D9 26 | | BNE MORE | ;Not done - then pulse some more |
| F8 | | | |
| 1DB BD | IGNR: | JSR IGNORE | ;Get around remaining codes |
| 03 | | | |
| 36 | | | |
| 1DE 7E | | JMP REGET | ;Go find the |
| 03 | | | ;bar again |
| 42 | | | |

ROUTINE TO REGISTER CENTER BAR AT START OF NEXT FRAME

| | | |
|---|---|---|
| 370 7F | REGISTER:CLR PULSTIM | Start with min. vert. |
| 00 | | sweep from present |
| F5 | | position |
| 373 96 | SWEEP: LDAA PULSTIM | Initiates a new sweep |
| F5 | | |
| 375 8B | ADDA #$08 | By incrementing the sweep |
| F5 | | timer |
| 377 97 | STAA PULSTIM | |
| F5 | | |
| 379 B6 | LDAA PIACRB | |
| 80 | | |
| 07 | | |
| 37C 81 | CMPA #$34 | |
| 34 | | |
| 37E 27 | BEQ .+4 | |
| 04 | | Switch vertical directions |
| 380 86 | LDAA #$34 | |
| 34 | | |
| 382 20 | BRA .+2 | |
| 02 | | |
| 384 86 | .+4: LDAA #$3C | |
| 3C | | |
| 386 97 | .+2: STAA SAVZ | Save direction for additional |
| EB | | pulse when bar found |
| 388 C6 | LDAB #$30 | Select med. slow motor speed |
| 30 | | for narrow sweep range |
| 38A 7C | INC SRCHFLAG | Flag to search for data |
| 00 | | during pulse |
| AG | | |
| 38D BD | JSR PULSE | Go do it |
| 01 | | |
| F0 | | |
| 390 96 | LDAA LITCNT | Result of pulse? |
| FZ | | |
| 392 27 | BEQ SWEEP | No data yet - Go again |
| DF | | ;Additional pulse after |
| | | registering bar, to make sure |
| | | bar is in view and prevent |
| | | misleading end of condition |

| | | |
|---|---|---|
| 394 86 01 | LDAA #$01 | by center |
| 396 97 F5 | STAA PULSTIM | ;Small size pulse |
| 398 96 FB | LDAA SAVZ | ;Load same motor direction as before |
| 39A C6 20 | LDAB #$20 | ;Slow motor speed |
| 39C BD 01 F0 | JSR PULSE | ;Do the pulse |
| 39F 39 | RTS | ;End of register routine |
| | | Performs next vert. move |
| 3B0 96 AB | VERTICAL: LDAA VERT | What direction required? |
| 3B2 2B 03 | BMI DOWNMOVE | Choose proper vert. direction for FINDBAR ROUTINE |
| 3B4 4F | CLRA | |
| 3B5 20 02 | BRA STORE | |
| 3B7 86 01 | DOWNMOVE: LDAA #$01 | |
| 3B9 20 1D | STORE: BRA PATCH 9 | Go store it |
| 3BB BD 02 E0 | FIND: JSR FINDBAR | Go across frame vert. to next guidebar |
| 3BE 86 34 | LDAA #$34 | Now guide along bar left to home position |
| 3C0 97 DA | STAA HORDIR | |
| 3C2 BD 00 53 | JSR CENTER | |

| | | |
|---|---|---|
| 3C5 96 A8 | LDAA VERT | Update frame counter |
| 3C7 2B 03 | BMI INCR | In which direction? |
| 3C9 4A | DECR: DECA | -Down if positive |
| 3CA 20 01 | BRA .+1 | |
| 3CC 4C | INCR: INCA | -Up if negative |
| 3CD 97 A8 | STAA VERT | Store it |
| 3CF 26 DF | BNE VERT | Done? If not, do another frame |
| 3D1 39 | RTS | Otherwise back to monitor for next |
| 3D8 97 AC | PATCH9: STAA OUTVIEW | Store vert. direction flag for findbar |
| 3DA 86 FF | LDAA #$FF | Now large hor. and vert. pulses to get away from present guidebar and angle bars |
| 3DC 97 F5 | STAA PULSTIM | Max. pulse width |
| 3DE 86 3C | LDAA #$3C | HORDIR=right |
| 3E0 C6 07 | LDAB #$07 | HOR. SPEED=medium |
| 3E2 BD 01 F0 | JSR PULSE | Do horizontal pulse |
| 3E5 96 AC | LDAA OUTVIEW | Which direction for large vertical pulse? |
| 3E7 27 04 | BEQ UP | |
| 3E9 86 34 | DOWN: LDAA #$34 | DOWN if outview=1 |
| 3EB 20 02 | BRA .+2 | |
| 3ED 86 3C | UP: LDAA #$3C | Up if outview=1 |
| 3EF C6 70 | .+2: LDAB #$70 | Select med. vert. speed |
| 3F1 BD 01 F0 | JSR PULSE | Do the vertical pulse |
| 3F4 20 C5 | BRA FIND | Ready to find next guidebar |
| | | Routine to ring 2 codes into view, read them and |

-continued

| | | |
|---|---|---|
| 47C 97<br>A2 | READZ:STAA LOWLIM | output to "RESULT"<br>Store limit from patch 7 for<br>verifying codes |
| 47E D7<br>A3 | STAB UPLIM | |
| 480 7F<br>00<br>D9 | READ2+4: CLR RESULT | Clear previously read codes |
| 483 7F<br>00<br>DF | CLR CODECNT | Clear count for number of<br>codes to read |
| 486 86<br>FF | NEXT: LDAA #$FF | Prepare to use pulse routine<br>with search for light feature |
| 488 97<br>F5 | STAA PULSTIM | Make search for time big |
| 48A 86<br>34 | LDAA #$34 | Select direction=left |
| 48C C6<br>02 | LDAB #$02 | Select slow hor. speed |
| 48E 7C<br>00<br>AG | INC SRCHFLG | Enable data search |
| 491 7E<br>02<br>36 | JMP PATCH12 | Search for next code |
| 494 00<br>00 | | When code is in view,<br>position and read it.<br>Back code into "RESULT" |
| 496 96<br>DF | BACK4: LDAA CODECNT | |
| 498 4C | | |
| 499 97<br>DF | STAA CODECNT | |
| 49B 81<br>02 | CMPA. #$02 | All codes read? |
| 49C 26<br>E8 | BNE NEXT | No - Get and re-read answer |
| 49E 39 | RTS | Yes - Back to monitor |
| 49F C6<br>04 | SWAP: LDAB #$04 | Routine called by decode to<br>swap digits of result, since<br>last digit was read first-<br>need to rotate 4 bits |
| 4A1 96<br>D9 | LOOP: LDAA RESULT | |
| 4A3 2B<br>03 | BME .+3 | |
| 4A5 06 | CLC | Determine carry for next<br>rotate |
| 4A6 20<br>01 | BRA .+1 | Swap by rotating 4 bits |
| 4A8 0D | .+3: SEC | |
| 4A9 79<br>00<br>D9 | .+1: ROL RESULT | |
| 4AC 5A | DEC B | All done? |
| 4AD 26<br>F2 | BNE LOOP | No - rotate again |
| 4AF 00 | | Yes - Back to PATCH 4 to<br>verify 2nd code |
| 4B0 BD<br>05 | PATCH4: JSR VERIFY | Verify code just read, output<br>is re-read=1 for good<br>read, φ for bad |
| 4B3 D6<br>A1 | LDAB REREAD | Good read? |
| 4B5 27<br>03 | BEQ GOOD | Yes - Return from decode<br>routine |
| 4B7 00<br>00<br>00 | | No - Go ahead anyway-<br>Do not re-read code<br>manually or automatically |
| 4BA 39 | GOOD: RTS | Return to READ 2 |
| 4BB BD<br>03<br>FC | PATCH4B: JSR DECODE | ;When code is in view, position<br>;and read it, pack code<br>;into result |
| 4BE 86<br>FF | LDAA #$FF | ;Set up another<br>;long pulse enable, to get off<br>code |
| 4C0 97<br>F5 | STAA PULSTIM | ;put the pulse<br>;length away |
| 4C2 86<br>34 | LDAA #$34 | ;We still want<br>;it to go left |

-continued

| | | |
|---|---|---|
| 4C4 C6 | LDAB #$02 | ;And, we want it |
| 02 | | ;to go slow |
| 4C6 7A | DEC SRCHFLG | ;Pulse until we get off code |
| 00 | | ;(Pulse until dark) |
| A6 | | |
| 4C9 BD | JSR PULSE | ;This is what actually |
| 01 | | ;Makes it go |
| F0 | | |
| 4CC 7E | JMP BACK4 | ;Go back to what was before |
| 04 | | ;it was not |
| 95 | | |
| 236 BD | PATCH12: JSR PULSE | Search for code |
| 01 | | |
| F0 | | |
| 239 BD | JSR SRCH | At end of search, has |
| 00 | | code been found? |
| 1E | | |
| 23C 96 | LDAA LITCNT | If so, data is non-zero |
| 12 | | |
| 23E 26 | BME FOUND | Yes - Go on |
| 03 | | |
| 240 7E | JMP NEXT | No - Do another search |
| 04 | | pulse |
| 86 | | |
| 243 7E | FOUND: | Go to decode here |
| 04 | | |
| BB | | |

Routine executed upon reaching home
on destination frame. Reads all codes
at destination, chooses next frame address
from array based on user key input.
Finally, return to home position on the
frame and proceeds to user next frame
for movement based on key input on 64 or 65.

| | | |
|---|---|---|
| 523 96 | CODES: LDAA PRESFRAME | Where are we now? |
| E2 | | |
| 525 81 | CMPA #$34 | If frame 64 or 65 (row 3, |
| 34 | | 4 or 5), must now read |
| | | string of codes to be |
| | | accessed by user keys. |
| 527 27 | BEQ BLTCODES | |
| 3A | | |
| | | If normal frame, must only |
| | | read single code pair to |
| 529 81 | CMPA #$35 | verify location at proper |
| 35 | | destination |
| 52B 27 | BEQ KEYCODES | |
| 36 | | |
| 52D 86 | NORMAL: LDAA #$3F | First store software interrrupt |
| 3F | | code to enable breakpoint |
| | | for next input automatically |
| 52F B7 | STAA ROUTE | |
| 02 | | |
| 71 | | |
| 532 86 | LDAA #$01 | Flag for PATCH 7 that |
| 01 | | frame is not 64 or 65 |
| 534 97 | STAA NORM | |
| A4 | | |
| 536 BD | JSR PATCH 7 | Do conversion and put |
| 05 | | result in limits to verify |
| 10 | | codes read. |
| 539 BD | JSR READZ | Now ready and verify |
| 04 | | |
| 7C | | |
| 53C B6 | SAME: LDAA #$01 | Initialize number of code |
| 01 | | pairs read to 1 for getting |
| | | back home |
| 53E 97 | STAA NUMBER | |
| DC | | |
| 540 BD | JSR BAKHOM | Get back to home position |
| 05 | | on frame |
| 46 | | |
| 543 7E | JMP ROUTE | Ready to go with user |
| 02 | | input |
| 71 | | |
| 546 97 | BAKHOM: STAA PULSNMR | |
| D4 | | |
| 548 86 | LDAA #$80 | Use med. pulse width |
| 80 | | |
| 54A 97 | STAA PULSTIM | |
| F5 | | |
| 54C 86 | LDAA #$3C | Pulse direction = right |

-continued

| | | |
|---|---|---|
| 3C | | |
| 54E C6 | LDAB #$08 | Pulse speed fast |
| 08 | | |
| 550 BD | JSR PULSE | Pulse over the codes |
| 01 | | |
| F0 | | |
| 553 7A | DEC PULSNMR | |
| 00 | | |
| D4 | | |
| 556 26 | BNE BAKHOM | |
| F0 | | |
| 558 BD | JSR REGISTER | Done jumping over codes, |
| 03 | | then find the guidebar |
| 70 | | |
| 55B BD | JSR CENTER | Back to left of bar for |
| 00 | | home position |
| 53 | | |
| 55E 39 | RTS | Ready to go on with user input, or automatic route to frame commanded by user key |
| 55F 00 | | |
| 00 | | |
| 00 | | |
| 562 00 | | |

| | | |
|---|---|---|
| 563 86 | KEYCODES: LDAA #$BD | Store original instruction into first instruction of next cycle, to enable automatic routine to frame selected with user key |
| BD | | |
| 565 B7 | STAA ROUTE | |
| 02 | | |
| 71 | | |
| 568 86 | LDAA #$07 | Number of code pairs to be read=7 |
| 07 | | |
| 56A 47 | STAA NUMBER | |
| DC | | |
| 56C 97 | STAA NUMCNT+1 | Init. counter to keep track of codes |
| DE | | |
| 56E 7F | CLR NORM | Indicate special frame 64 or 65 for PATCH 7 |
| 00 | | |
| A4 | | |
| 571 8D | PAIR: BSR PATCH 7 | Calc. limits for valid code read |
| 9D | | |
| 573 BD | JSR READZ | Read next pair of codes |
| 04 | | |
| 7C | | |
| 576 DE | LDX NUMCNT | Load pointer to array for storing the result |
| DD | | |
| 578 96 | LDAA RESULT | Fetch result of code |
| D9 | | |
| 57A A7 | STAA KEYTABL-1,X | Now store in table for access by key input later |
| E2 | | |
| 57C 7A | DEC NUMCNT+1 | Count off the codes just read |
| 00 | | |
| DE | | |
| 57F 26 | BNE PAIR | Not done yet? Then read another pair of codes |
| F0 | | |
| 581 86 | SELECT: LDAA #$C0 | Prepare to light up next frame LED |
| C0 | | |
| 58B 20 | BRA READKY | Then go wait for user to select next frame with a key |
| 1B | | |

Routine to convert present frame number into decimal format for comparison with result of reading codes, and set upper and lower limits to verify code reading

| | | |
|---|---|---|
| 510 7C | PATCH 7: INC CONVERT | Enable flag for conversion in this direction |
| 00 | | |
| A5 | | |
| 513 BD | JSR NINES | Do conversion on NEXFRAME (=PRESFRAME): Result of conversion is in ACCA |
| 02 | | |
| C5 | | |
| 516 D6 | LDAB NORM | Is frame normal (not 64 or 65)? |
| A4 | | |
| 518 27 | BEQ SPECIAL | No - store special limits for codes on frames 64, 65 |
| 03 | | |
| 51A 16 | TAB | Yes - Both limits are=PRESFRAME |
| 51B 20 | BRA SETLIM | Limits are in ACCA, ACCB |
| 04 | | |
| 51D C6 | SPECIAL:LDAA #$79 | Upper limits for frames 64, 65 is high digit=7, low digit=9 |
| 79 | | |

-continued

| | | |
|---|---|---|
| 51F 86 60 | LDAA #$60 | Lower limit is high digit =6, low digit=0 |
| 521 39 | SETLIM: RTS | Return then read 2 intermediately stored ACCA and ACCB into limits |

SWITCH REG. READ
PROGRAM - WAITS FOR SWITCH TO BE PRESSED, LEADS THE REGISTER, WAITS FOR SWITCH RELEASE AND SELECTS NEXT FRAME

| | | |
|---|---|---|
| 585 87 06 00 | SWITCH: STAA LEDREG | Light up appropriate LED's |
| 588 B6 07 00 | READ1: LDAA SWREG | Read switch register |
| 58B 81 80 | CMPA #$80 | Will have top bit set |
| 58D 27 F9 | BEQ READ1 | Wait for switch to be pressed |
| 58F 80 80 | SUBA #$80 | Erase top bit, |
| 591 97 D8 | STAA KEYREG | And save result |
| 593 B6 07 00 | READ2: LDAA SWREG | Wait for switch release |
| 596 81 80 | CMPA #$80 | Topbit will again be set |
| 598 26 F9 | BNE READZ | All other bits should be reset |
| 59A 86 40 | LDAA #$40 | Now clear LED's |
| 59C 7E 01 7A | JMP PATCH 11 | Go finish the routine |

| | | |
|---|---|---|
| 17A B7 06 00 | PATCH11: STAA LEDREG | Clear LED's |
| 17D 96 AE | LDAA PREV | In case of previous bad read, recall previous result before re-reading (In case of next frame, this doesn't matter) |
| 17F 97 D9 | STAA RESULT | |
| 181 39 | RTS | Back to caller |
| 5A0 BD 05 85 | READKY: JSR SWITCH | Read user selection key |
| 5A3 CE 00 06 | LDX #$0006 | Yes - prepare to access table based on switch read |
| 5A6 86 40 | LDAA #$40 | Switch #6 is bit 6 set in SWREG |
| 5A8 91 D8 | BACK: CMPA KEYREG | Was this switch pressed? |
| 5AA 27 07 | BEQ MATCH | Yes - Go access table |
| 5AC 09 | DEX | No - Advance table pointer |
| 5AD 44 | LSRA | Advance to next down the line |
| 5AE 26 F8 | BNE BACK | Last switch checked? No go check another |
| 5B0 7E 05 81 | ERR1: JMP SELECT | Yes - switch data invalid; interrupt for user to try again |
| 5B3 A6 E3 | MATCH: LDAA KEYTABL,X | Fetch code data from table, as selected by switch |
| 5B5 97 E1 | STAA NEXFRAME | Code data is next frame address |
| 5B7 86 04 | LDAA #$04 | Go back to home position before moving to next frame |
| 5B9 BD 05 46 | JSR BAKHOM | |
| 5BC 7E 02 71 | JMP ROUTE | Ready to do it over again |

GENERAL PURPOSE PATTERN RECOGNITION SUBROUTINE

Extracts Features According To The Following Definitions
→ Start of feature is two consecutive "light" half-bytes (INPTID) = 1)
→ INPTID = 0 - "DON'T CARE"- Counts as "light" inside feature, "dark" if outside
→ End of feature is last "light" half-byte preceeding first "dark" half-byte
Calls XAMIN to determine INPTID, scans to end of feature or end of array, whichever first output is feature (Start, Length) in half-bytes
If no feature is found, FEATSTRT = 0

| Addr | Code | Label | Instruction | Comment |
|---|---|---|---|---|
| 100 | 4F | XTRACT: | CLRA | Clear outputs as signal in case no signal is found |
| 101 | 97 F2 | | STAA LITCNT | |
| 103 | 97 F1 | | STAA FEATSTRT | |
| 105 | 00 00 00 00 | | | |
| 109 | BD 01 46 | FSTIME: | JSR XAMIN | Examine next half-byte |
| 10C | 86 1E | | LDAA #$1E | All data examined? |
| 10E | 91 D7 | | CMPA BYTPTR+1 | |
| 110 | 26 01 | | BNE CHKOUT | No - Go look for start of feature |
| 112 | 39 | | RTS | Yes - GO back to caller |
| 113 | 96 AA | CHKOUT: | LDAA INPTID | What did last half-byte contain |
| 115 | 2E 0B | | BGT FIRST 1 | ≧75% light- possible feature |
| 117 | 7F 00 F2 | | CLR LITCNT | <75% light- cancel feature |
| 11A | 20 ED | | BRA FSTIME | +keep looking |
| 11C | 00 00 00 00 00 00 | | | |
| 122 | 7C 00 F2 | FIRST1: | INC LITCNT | First light data found- add to length of feature |
| 125 | B6 02 | | LDAA #$02 | Two consecutive light half-bytes found yet? |
| 127 | 91 F2 | | CMPA LITCNT | |
| 129 | 26 DE | | BNE FSTIME | No - look for second |
| 12B | 96 D7 | | LDAA BYTPTR+1 | Yes - Calculate start of feature |
| 12D | 48 | | ASLA | By multiplying bytes |
| 12F | 9B AB | | ADDA HLFPTR | Add half-byte count (0 or 1) |
| 130 | 80 02 | | SUBA #$02 | +Subtract half-bytes, Byte count always looks ahead one byte |
| 132 | 97 F1 | | STAA FEATSTRT | Store start of feature |
| 134 | BD 01 46 | 2NDTIME: | JSR XAMIN | Look at next half-byte |
| 137 | 96 AA | | LDAA INPTID | Result? |
| 139 | 2A 01 | | BPL SECND1 | ≧50% light (0 to 1) INPTID add to feature |
| 13B | 39 | | RTS | <50% light - end of feature |
| 13C | 7C 00 F2 | SECND1: | INC LITCNT | Add to feature |
| 13F | 86 20 | CHECKIN: | LDAA #$20 | End of data? |
| 141 | 91 D7 | | CMPA BYTPTR+1 | |
| 143 | 26 EF | | BNE 2NDTIME | No - Look at next half-byte |
| 145 | 3A | | RTS | Yes - end of feature |

EXAMINE SUBROUTINE

HLFTR = 0 or 1 HALF-BYTE FROM BYTABL, OUTPUT IS (INPTID = 1 >½ bits set, -1 for <½ bits set, 0 for ½ bits set)

| Addr | Code | Label | Instruction | Comment |
|---|---|---|---|---|
| 146 | DE D6 | XAMINE: | LDX BYTPTR | |
| 148 | A6 B2 | | LDAA BYTABL+1,X | Fetch data pointed to by BYTPTR |
| 14A | D6 AB | | LDAB HLFPTR | Which half-byte is desired? |
| 14C | 26 09 | | BNE RHLF | If right (low order) ignore next step |
| 14E | 7C 00 AB | | INC HLFPTR | If left (high order) point to right for next time, |
| 151 | 44 | | LSRA | Shift left data into right half-byte with zeros in left half-byte |
| 152 | 44 | | LSRA | |
| 153 | 44 | | LSRA | |
| 154 | 44 | | LSRA | |
| 155 | 20 08 | | BRA IDENT | +Go on |
| 157 | 84 0F | RHLF: | ANDA #$0F | Mask out left byte |
| 159 | 7A 00 AB | | DEC HLFPTR | Point to left half-byte for next step |
| 15C | 7C 00 D7 | | INC BYTPTR+1 | Point to next byte for next step |
| 15F | B7 01 66 | IDENT: | STAA HERE | Data is used as index for table |
| 162 | CE 01 6A | | LDX #IDTABL | X contains table base address |
| 165 | E6 00 | HERE: | LDAB O,X | |
| 167 | D7 AA | | STAB INPTID | Store result of table look-up |
| 169 | 39 | | RTS | All done |

| | | | | | | |
|---|---|---|---|---|---|---|
| 01 16A | FF | IDENT: identifies input data as light (01), dark (FF) or either (00) | 0 | 01 172 | FF | 8 |
| 01 | FF | | 1 | 00 | 00 | 9 |
| 01 16C | FF | | 2 | 00 174 | 00 | A |
| 00 | 00 | | 3 | FF | 01 | B |
| 01 16E | FF | | 4 | 00 176 | 00 | C |
| 00 | 00 | | 5 | FF | 01 | D |
| 00 170 | 00 | | 6 | FF 178 | 01 | E |

-continued

EXAMINE SUBROUTINE

| | | FF | 01 | | 7 | FF | 01 | F |
|---|---|---|---|---|---|---|---|---|

INTERFACE PROGRAM
INIT-SETS UP INPUT/OUTPUT PIA'S
SRCH-GENERAL PURPOSE SUBROUTINE TO
FIND FIRST FEATURE
STRINT-START INTERRUPT

| 00 0F | INIT: | SEI | Do not interrupt until this routine is completed |
|---|---|---|---|
| 01 86 | | LDA #$30 | Select DDR for 8004 |
| 30 | 103 B7 | STA PIACRA | |
| 80 | | | |
| 05 | | | |
| 06 B7 | | STAA PIACRB | ←And 8006, with falling edge sensor interrupt trig. |
| 80 | | | |
| 07 | | | |
| 09 7f | | CLR PIACRA | Select all lines of 8004 as inputs |
| 80 | | | |
| 04 | | | |
| 0C 86 | | LDAA #$FF | |
| FF | | | |
| 0E B7 | | STAA PIAORB | Select all lines of 8006 as outputs |
| 80 | | | |
| 06 | | | |
| 11 96 | | LDAA HORDIR | Select proper horizontal direction |
| DA | | | |
| 13 87 | | TAA PIACRA | +Store in 8005 |
| 80 | | | |
| 05 | | | |
| 16 86 | | LDAA #$40 | Blank LED's |
| 40 | | | |
| 18 B7 | | STAA LEDREG | |
| 06 | | | |
| 00 | | | |
| 1B 0E | | CLI | Now ready for interrupts |
| 1C 39 | | RTS | Back to monitor |
| 1E 7C | SRCH: | INC PIACRB | Enable sensor interrupt |
| 80 | | | |
| 07 | | | |
| 21 3E | | WAI | Wait for new data |
| 22 7F | | CLR BYTPTR | Initialize pointers to left edge of view |
| 00 | | | |
| D7 | | | |
| 25 7F | | CLR HLFPTR | |
| 00 | | | |
| AB | | | |
| 28 BD | | JSR XTRACT | +Extract leftmost feature |
| 01 | | | |
| 00 | | | |
| 2B 39 | | RTS | Back to caller |
| 30 7A | INTRUP: | DEC PIACRB | Disable further start interrupts |
| 80 | | | |
| 07 | | | |
| 33 CE | | LDX #$00 | Reset input data counter |
| 00 | | | |
| 00 | | | |
| 36 7C | | INC PIACRA | Enable sensor data interrupt |
| 80 | | | |
| 05 | | | |
| 39 86 | WAT: | LDAA #$80 | Mask out all but interrupt bit |
| 80 | | | |
| 3B B4 | | ANDA PIACRA | |
| 80 | | | |
| 05 3F | | BEQ WAIT | Wait for interrupt to occur |
| 27 | | | |
| F9 | | | |
| 40 B6 | | LDAA PIAORA | Then fetch input data |
| 80 | | | |
| 04 | | | |
| 43 A7 | | STAA BYTABL,X | +Store in proper byte of table |
| B1 | | | |
| 45 08 | | INX | Update data counter |
| 46 8C | | CPX #$20 | All done? |
| 00 | | | |
| 20 | | | |
| 49 26 | | BNE WAIT | No-back for next byte |
| EE | | | |
| 4B 7A | DONE: | DEC PIACRA | Yes-disable sensor interrupt until next interrupt routine |
| 80 | | | |
| 05 | | | |

-continued
INTERFACE PROGRAM
INIT-SETS UP INPUT/OUTPUT PIA'S
SRCH-GENERAL PURPOSE SUBROUTINE TO
FIND FIRST FEATURE
STRINT-START INTERRUPT

| | | | |
|---|---|---|---|
| 4E 96<br>B1 | | LDAA BYTABL | Shift leftmost data to right<br>end since first data byte was<br>missed |
| 50 97<br>D1 | | STAA BYTABL+21 | |
| 52 3B | | RTI | +Return |

CENTER

| | | | |
|---|---|---|---|
| 53 BD<br>00<br>1E | CENTER: | JSR SRCH | Get start and length of<br>guidebar |
| 56 D6<br>F2 | | LDAB LITCNT | Length=0? |
| 58 26<br>04 | | BNE GUIDE | No - Guidebar was found |
| 5A 7E<br>01<br>A0<br>5D 00 | | JMP PATCH 2 | Yes - Check to make sure<br>blank data was really seen |
| 5E 7F<br>00<br>AD | GUIDE: | CLR BLANKCNT | Guidebar found - reset<br>blank data flag |
| 61 96<br>F1 | | LDAA FEATSTRT | Start of bar at left edge of view |
| 63 27<br>25 | | BEQ LEFT | Yes - Go center the bar |
| 65 9B<br>F2 | | ADDA LITCNT | No - End of bar at right edge<br>of view? |
| 67 81<br>40 | | CMPA #$40 | |
| 69 27<br>19 | | BEQ RIGHT | Yes - Go center the bar |
| 6B C1<br>04 | | CMPB #$04 | No - Does bar have minimum<br>valid width? |
| 6D 2C<br>2A | | BGE SIDE 1 | Yes - Go see if it needs centering |
| 6F 86<br>3C | | LDAA #$3C | No - Enable PIA to stop motor |
| 71 00 | | | |
| 72 20<br>0C | | BRA HOR ONLY | - Go do it |
| 74 D6<br>F1 | SIDE: | LDAB FEATSTRT | Check if guidebar needs<br>centering |
| 76 C1<br>08 | | CMPB #$08 | ←Left edge extreme, bar<br>must start either left or<br>allowed area |
| 78 2D<br>10 | | BLT LEFT | |
| 7A C1<br>38 | | CMPB #$38 | ←Right edge extreme |
| 7C 2E<br>06 | | BGT RIGHT | Or right of allowed area |
| 7E 86<br>34 | | LDAA #$34 | No centering required |
| 80 C6<br>06 | HORONLY: | LDAB #$06 | Load horizontal speed only |
| 82 20<br>0A | | BRA STOMOTR | +Store in PIA |
| 84 86<br>34 | RIGHT: | LDAA #$34 | If bar too far right (down)<br>make vertical direction up; |
| 86 C6<br>23 | | LDAB #$23 | Store-vert. speed=2, Hor.<br>speed=3 |
| 88 20<br>04 | | BRA STOMOTR | +Store in PIA |
| 8A 86<br>3C | LEFT: | LDAA #$3C | If bar too far left (up)<br>make vertical direction down |
| 8C C6<br>23 | | LDAB #$23 | Vert. speed=2, Hor. speed=3 |
| 8E B7 | STOMOTR: | STAA PIACRB | Store vertical direction |

-continued

| | | CENTER | |
|---|---|---|---|
| | 80 | | |
| | 07 | | |
| 92 | F7 | STAB PIAORB | +Both motor speeds |
| | 80 | | |
| | 06 | | |
| 94 | 00 | | |
| | 00 | | |
| 96 | 7E | JMP CENTER | Back to start |
| | 00 | | |
| | 53 | | |
| 99 | 96 | SIDE1: LDAA HORDIR | Makes sure proper horizontal |
| | DA | | direction is chosen for this |
| | | | cycle |
| 9B | B7 | STAA PIACRA | |
| | 80 | | |
| | 05 | | |
| 9E | 20 | BRA SIDE | |
| | D4 | | |
| A0 | 39 | END: RTS | |
| 1A0 | 86 | PATCH2:LDAA #$03 | Valid blank at edge of guidebar |
| | 03 | | |
| 1A2 | B7 | STAA PIAORB | Slow down motor in case |
| | 80 | | this is valid blank |
| | 06 | | |
| 1A5 | 96 | LDAA BLANKCNT | Register blank data |
| | AD | | |
| 1A7 | 4C | INCA | |
| 1A8 | 81 | CMPA #$04 | Blank data seen min. number |
| | 04 | | times in a row? |
| 1AA | 27 | BEQ .+5 | Yes - Stop motor and exit |
| | 05 | | from center |
| 1AC | 97 | STAA BLANKCNT | No - keep timing the blank |
| | AD | | |
| 1AE | 7E | JMP CENTER | Back another time |
| | 00 | | |
| | 53 | | |
| 1B1 | 86 | .+5: LDAA #$34 | Store vertical direction |
| | 34 | | |
| 1B3 | 5F | CLRB | +Clear both motors |
| 1B4 | B7 | STAB PIAORB | |
| | 80 | | |
| | 07 | | |
| 1BA | 7F | CLR BLANKCNT | Reset flag automatically |
| | 00 | | |
| | AD | | |
| 1BD | 39 | RTS | True end of guidebar here |

| | | PULSE | |
|---|---|---|---|
| 1F0 | C1 | PULSE: CMPB #$10 | B contains motor |
| | 10 | | speed, is pulse vert.? |
| | | | - If so B ≧ 10 |
| 1F2 | 2D | BLT HORDIR | No-Store direction |
| | 05 | | in hor. PIA |
| 1F4 | B7 | STAA PIACRB | |
| | 80 | | |
| 1F7 | 20 | BRA .+8 | |
| | 08 | | |
| 1F9 | B7 | HORDIR: STAA PIACRA | |
| | 80 | | |
| | 05 | | |
| 1FC | 86 | LDAA #$34 | If horizontal; motor |
| | 34 | | may not yet be |
| | | | enabled for output, |
| | | | Go do it |
| 1FE | B7 | STAA PIACRB | |
| | 80 | | |
| | 01 | | |
| 201 | F7 | .+8: STAB PIAORB | Start upmotor |
| | 80 | | |
| | 06 | | |
| 204 | D6 | LDAB PULSTIM | Fetch pulse width |
| | F5 | | |
| 206 | 5A | MORE: DECB | |
| 207 | 27 | BEQ STOP | Pulse timed out? |
| | 0A | | |
| 209 | 96 | LDAA SRCHFLG | No-Data search |
| | A6 | | desired during |

-continued

| | | PULSE | |
|---|---|---|---|
| | | | pulse? |
| 20B | 26 | BNE JUMP | Yes-Go look |
| | 0D | | |
| 20D | 4F | CLRA | Execute inner wall |
| 20E | 4A | LOOP DECA | Loop |
| 20F | 26 | BNE LOOP | |
| | FD | | |
| 211 | 20 | BRA MORE | +Go test for end of |
| | F3 | | pulse |
| 213 | 7F | STOP: CLR PIAORB | Yes-Stop motor |
| | 80 | | |
| | 06 | | |
| 216 | 7F | CLR SRCHFLG | Reset input enable |
| | 00 | | Flag |
| | A6 | | |
| 219 | 39 | RTS | Back to caller |
| 21A | 7E | JUMP JMP PATCH 1 | |
| | 01 | | |
| | 83 | | |
| 183 | D7 | PATCH1: STAB SAV1 | ; Save B to keep |
| | D2 | | count pulse width |
| 185 | BD | AGAIN: JSR SRCH | ; Go look |
| | 00 | | |
| | 1E | | |
| 188 | F6 | LDAB SAV1 | ;Bring it back |
| | 00 | | |
| | D2 | | |
| 18B | 96 | LDAA LITCNT | ;Get the data |
| | F2 | | |

PULSE

| | | | |
|---|---|---|---|
| 26 06 | | BNE LIGHT | ;Go see what to do about it |
| 18F 96 | DARK: | LDAA SRCHFLG | ;If no data, stop if <0 |
| A6 | | | ;Keep going if >0 |
| 191 2B 06 | | BMI STOP1 | ;Here for stop |
| 193 20 07 | | BRA MORE1 | ;Else Here for more pulse |
| 195 96 A6 | LIGHT: | LDAA SRCHFLG | ;If data there, stop if ;Search flag >0, |

PULSE

| | | | |
|---|---|---|---|
| | | | and keep going if SRCHFLAG >0 |
| 197 2B 03 | | BMI MORE 1 | ;Here for more pulse |
| 199 7E 02 13 | STOP1: | JMP STOP | ;Here for stop |
| 19C 7E 02 06 | MORE1: | JMP MORE | ;Here for more pulse |

DECODE

Positions, reads & packs a code when brought into view by monitor

| | | | |
|---|---|---|---|
| 3F7 86 00 | DECODE-5: | LDAA #$00 | Turn on reread LED |
| 3F9 BD 05 B5 | | JSR SWITCH | Only executed if code out of focus - user presses red switch after focussing, then code re-read |
| 3FC 86 3C | DECODE: | LDAA #$3C | Slow movement in up direction to position + read index bar |
| 3FE C6 20 | | LDAB #$20 | Select slow vert. speed |
| 400 B7 80 07 | | STAA PIACRB | Store direction |
| 403 F7 80 06 | | STAB PIAORB | Store speed to start motor |
| 406 BD 00 1E | INDEX: | JSR SRCH | Read leftmost feature (Index BAR) |
| 409 96 F1 | | LDAA FEATSTRT | Look where it starts |
| 40B 81 20 | | CMPA #$20 | Far enough to right? |
| 40D 2D F7 | | BLT INDEX | |
| 40F 00 00 00 00 | | | |
| 413 86 34 | ENOUGH: | LDAA #$34 | Now reverse direction to bring all data into view |
| 415 87 80 07 | | STAA PIACRB | (Index bar at far left) with same slow speed |
| 418 BD 00 1E | FIX: | JSR SRCH | Fixes index bar at top of view |
| 41B 96 F1 | | LDAA FESTSTRT | Look where index bar starts |
| 41D 81 10 | | CMPA #$10 | Close enough to top |
| 41F 2E F7 | | BGT FIX | No - keep moving down |
| 421 7E 04 FB | | JMP CALC | Yes - Stop motor & calculate size of final positioning pulse |
| 424 8B 0A | FINAL: | ADDA #$0A | Add in exp. deter. pulse width, set up to remove index bar and erase all data in view |
| 426 97 F5 | | STAB PULSINT | |
| 428 86 34 | | LDAA #$34 | direction=down |
| 42A C6 30 | | LDAB #$30 | Speed=Slow vertical |
| 42C BD 01 F0 | | JSR PULSE | -Do it; then ready to stabilize view for reading the data bars |
| 42F 86 F0 | | LDAA #$F0 | Long pulse width=delay time |
| 431 97 F5 | | STAA PULSTIM | |
| 433 86 34 | | LDAA #$34 | Do not change motor direction |
| 435 5F | | CLRB | No motion during delay |

DECODE-continued

Positions, reads & packs a code when brought into view by monitor

| | | |
|---|---|---|
| 436 BD<br>01<br>F0 | JSR PULSE | Perform the delay-then read to read data |
| 439 96<br>D9 | INTERPRET: LDAA RESULT | ;Routine is to read properly asitioned code by interrupting data found in the four quadrants of the view |
| 43B 97<br>AF | STAA PREV | ;Save previous results in case this read is bad |
| 43D BD<br>02<br>46 | JSR SCAN | ;First get the data. |
| 440 96<br>F4 | LDAA CODEPTRM | Determine how many features were found, from size of array |
| 442 81<br>06 | CMPA #$06 | ;Less than three features (6 Bytes?) |
| 444 2D<br>B3 | BLT DECODE-5 | ;Yes - Wait for user switch as signal that focussing has been adjusted, then re-read code |
| 446 81<br>0A | CMPA #$0A | ;> 5 features (10 bytes)? |
| 448 2C<br>A9 | BGE DECODE-5 | ;Yes - Wait as above, then re-read code |
| 44A 96<br>F6 | LDAA CODETABL | ;No - Where does first feature start? |
| 44C 97<br>EA | STAA QUAD | ;Initialize quad, marker to start of first feature- |
| 00<br>00 | | delimits quadrant in which first data bar is expected |
| 450 7F<br>00<br>D3 | CLR BARCNT | Points to data bar presently being interpreted |
| 45B CE<br>00<br>00 | LDX #$0000 | |
| 456 DF<br>EE | STX TEMP+2 | Points to feature presently under investigation |
| 458 00<br>00<br>00 | | ;Look for feature start within specified tolerance of quadrant marker |
| 45B DE<br>EE | NEXFEAT: LDX TEMP+2 | ;Fetch feature pointer |
| 45D A6<br>F6 | LDAA CODETABL,X | ;Use it to fetch feature start |
| 45F 90<br>EA | SUBA QUAD | ;Find distance from feature to quad. marker= Abs. value of (FEATSTRT-QUAD) |
| 461 2A<br>01 | BPL .+1 | |
| 463 40 | NEGA | ;Change sign only if neg. |
| 464 81<br>06 | .+1: CMPA #$06 | ;Is feature in quadrant, within tolerance? |
| 466 2F<br>68 | BLE READ | ;Yes - Assign it to the data bar and read it |
| 468 08 | INX | ;No - Advance pointer to next feature |
| 469 08 | INX | |
| 46A DF<br>EE | STX TEMP+2 | |
| 46C 96<br>EF | LDAA TEMP+3 | ;Check for end of feature array |
| 46E 91<br>F4 | CMPA CODEPTR+1 | |
| 470 2D<br>E9 | BNT NEXFEAT | ;Not at end of array, keep looking |
| 472 00<br>00<br>00<br>00<br>00<br>00 | | ;If pointing past end of array, no feature was found for the data bar - Assign thin feature (CODE=1) to the bar by setting carry bit |
| 478 0D | SEC | |
| 479 7E<br>04<br>DA | JMP ASSIGN | |
| | | ;Reads selected feature and assigns it to a data bar |

DECODE-continued

Positions, reads & packs a code when brought into view by monitor

|  |  |  |
|---|---|---|
|  |  | (0 or 1) then packs data bar into result and sets up for next data bar, if any. |
| 4D0 86<br>05 | READ: LDAA #$05 | ;Fetch min. size for "FAT" (0) (BAR) |
| 4D2 A1<br>F7 | CMPA CODETABL+1,X | ;Compare with feature size |
| 4D4 2F<br>03 | BLE ZERO | ;Data bar larger, must be 0 |
| 4D6 0D | SEC | ;Data bar smaller, must be 1 |
| 4D7 20<br>01 | BRA ASSIGN |  |
| 4D9 0C | ZERO: CLC |  |
| 4DA 79<br>00<br>D9 | ASSIGN: ROL RESULT | ;Carry contains data bar value-<br>Shift left into Z-digit result |
| 4DD 96<br>D3 | LDAA BARCNT | ;Check for last data bar |
| 4DF 81<br>03 | CMPA #$03 |  |
| 4E1 26<br>07 | BNE SETUP | ;Not yet - set up for next bar |
| 4E3 96<br>DF | LDAA CODECNT | ;Last bar - is this first code? |
| 4E5 27<br>C9 | BEQ PATCH 4 | Yes - Verify the code |
| 4E7 20<br>B6<br>00 | BRA SWAP | No - wait until digits are swapped to verify |
| 4EA CE<br>00<br>00 | SETUP: LDX #$0000 | ;Get feature pointer back to start of array |
| 4ED DF<br>EE | STX TEMP+2 |  |
| 4EF 7C<br>00<br>D3 | INC BARCNT | ;Advance bar count |
| 4F2 96<br>EA | LDAA QUAD | ;Advance quad, marker |
| 4F4 8B<br>0E | ADDA #$0E |  |
| 4F6 97<br>EA | STAA QUAD | ;Store it |
| 4F8 7E<br>04<br>5B | JMP NEXFEAT | ;Start looking for new data bar |
|  |  | ;Check to see if in<br>;Position for final pulse<br>;to remove index bar |
| 4FB 81<br>10 | CALC: CMPA #$10 | ;is index bar still to left of ¼ mark? |
| 4FD 2F<br>06 | BLE NOTRDY | ;Yes - not read for final<br>;pulse - keep moving down |
| 4FF 7F<br>80<br>06 | CLR PIAORB | ;No - Stop motor |
| 502 7E<br>04<br>24 | JMP FINAL | ;Calculate size of final<br>;pulse from index bar position<br>;in ACCA |
| 505 7E<br>03<br>FC | NOTRDY:JUMP DECODE | ;If sent here go back<br>; and start positioning<br>;over again |
| 508 00<br>00<br>00<br>00<br>00<br>00<br>50F 00 |  |  |
|  |  | Subroutine to verify code just read Low lim., up lim. give accepted range for code verification. |
| 5EB 96<br>A2 | VERIFY:LDAA LOWLIM | Fetch limits - lower |
| 5ED D6<br>A3 | LDAB UPLIM | -upper |
| 5EF 7D<br>00 | TST CODECNT | 1st or 2nd code? |

DECODE-continued

Positions, reads & packs a code when brought into view by monitor

| | EF | | |
|---|---|---|---|
| 5F2 26 | | BNE NOMASK | If second (1 code already |
| | CD | | counted) compare code with |
| | | | full limits |
| 5F4 84 | | ANDA #$0F | If first (no codes counted) |
| | 0F | | compare code read with |
| | | | lower digit of limits only |
| 5F6 C4 | | ANDB #$0F | |
| | 0F | | |
| 5F8 20 | | BRA NOMASK | Go compare |
| | C7 | | |
| 5C1 91 | | NOMASK: CMPA RESULT | Is code read result less than |
| | D9 | | lower limit? |
| 5C3 2E | | BGT SET | ;Yes - Set re-read flag |
| | 07 | | |
| 5C5 D1 | | CMPB RESULT | No - greater than upper limit? |
| | D9 | | |
| 5C7 2D | | BLT SET | Yes - set re-read flag |
| | 03 | | |
| 5C9 4F | | CLEAR: CLRA | No - clear re-read flag |
| 5CA 20 | | BRA .+2 | Go do it |
| | 02 | | |
| 5CC 86 | | SET: LDAA #$01 | Set re-read flag here |
| | 01 | | |
| 5CE 97 | | .+2: STAA READ | Go do it |
| | A1 | | |
| 5DO 39 | | RTS | Return to caller |

IV. COMBINED DIGITIZED AND VIEWER MICRIFICHE INFORMATION RETRIEVAL

A. Parts Management and Inventory Control Example

In the foregoing discussions, the system has been covered with respect to proper alignment of a microfiche, both with respect to the viewer and with respect to the scanner. A specific example will now be provided with respect to a combined system, suitable for PMIC applications, with reference to FIGS. 1, 1A, 2, 3 and 14.

In utilizing the apparatus of FIG. 14 in PMIC application, a single microprocessor may be employed. In addition to the apparatus already discussed, peripheral apparatus is provided for the scanner, which apparatus comprises a scanner control 202 and the sensor apparatus disclosed in FIG. 7, namely the sensor position drive 90, the sensor alignment drive 92, the scanner sensor 98, and the sensor register 102, as well as the auxiliary apparatus used in displaying, recording and transmitting the output data. This latter apparatus comprises the LED display 22, the line printer 14, the digital tape recorder 15, and the MODEM unit 16.

Before turning to a specific example, as can be seen in FIG. 1, a dealership information terminal is generally illustrated at 10 as comprising a microfiche file 11 which includes master, parts and price microfiche, a viewer 12, a scanner 13, a printer 14, a tape recorder 15, a MODEM unit 16, and his local telephone instrument 17. The telephone instrument 17 may be used to connect the terminal by way of the telephone network 18 to a central computer 19 located in a plant which supplies parts to the dealership.

The printer may advantageously be a line printer, such as the 40 character line printer of Anadex model DP-1000. A suitable tape recorder is the digital recorder, known as the SC-1000 Dumb Recorder, manufactured by Seaton Corp. The MODEM unit may be a Data COM 302.

The viewer 12 is illustrated as comprising a viewing screen 20 which is positioned with respect to an optical system (not shown) which includes a microfiche transport which receives the viewer-type microfiche through a slot 21. A digital display 22, for example a LED display, is positioned immediately below the viewing screen 20.

The viewer 12 also comprises a keyboard which includes a four-function calculator unit 23 and a plurality of operational switches 24-33, the purpose of which will become evident from the description below.

FIG. 2 illustrates a portion of a frame 34 of a viewer microfiche, corresponding to a frame 112 of FIG. 8, which microfiche is a master microfiche, while FIG. 3 illustrates a frame 35, also corresponding to a frame 112 of FIG. 8, of a viewer microfiche which is constructed as a parts fiche. The frame 35 is illustrated as comprising one portion 36 which bears graphic information, here in the form of an exploded view of a pump, and another portion 37 which bears alphanumeric information concerning the parts illustrated in the frame portion 36.

Assuming now that a customer goes to the parts department of a dealership, for example a farm equipment dealership, needing a part for a tractor. The customer has the model number and can describe where the part is located on the tractor.

Armed with this information, the parts man matches the machine and model information provided by the customer to the machine and model information on the header of the parts microfiche in the microfiche file 11, extracts the corresponding microfiche from the microfiche file and reads from the header that the parts on this microfiche are also found on the price microfiche #1. He then extracts the corresponding price microfiche and inserts the parts microfiche in the slot 21 of the viewer and the price microfiche in the slot 13' of the scanner 13. The price microfiche, of course, takes the form discussed above with respect to FIGS. 4 and 5, and has a header which identifies the models served by that parts microfiche. There are, of course, fewer price microfiche than parts microfiche, since a single price microfiche carries prices for several models. The data itself is in the form of digitized codes readable to the scanner, rather than to the human eye.

The parts man then turns the viewer on with the ON-OFF switch 44 to energize all of the system hardware and the microfiche are automatically registered in place.

The parts man then presses the HOME button 33 which inputs an address for a home position into the entry register 180 (FIG. 14) to automatically index the microfiche to the first frame. The first frame is an index frame which bears alphanumeric information for the parts on that particular microfiche, such as "Dual Pump—Frame 12." The parts man then enters the 12 with the numerical keys 23 and presses the ADVANCE key 30. The 12 is the address and the key 30 provides the activation. The system operates for alignment as discussed above so that frame 12 becomes properly registered and the content thereof appears on the screen 20. In this example, this is the frame illustrated in FIG. 3. The parts man then checks the part and its location with the customer to determine if the proper part has, indeed, been selected. In this example, the part 11 indicated at 38 is the desired part and is described with the key number 11 at 39 in the portion 37 of the frame as being the manufacturer's part number W 11852, as seen at 40, and is described at 41 to be a SHAFT-drive (1). The correct part corresponds to the locator number "(1) 01-237". The portion (1) of the locator number indicated at 42 corresponds to the price microfiche. The locator number has a two-fold function. First of all, within the dealership the locator number can identify a physical location of the part, e.g. the corresponding part bin. Secondly, the locator number portion 43 is the address for the price microfiche.

Figure 1A:
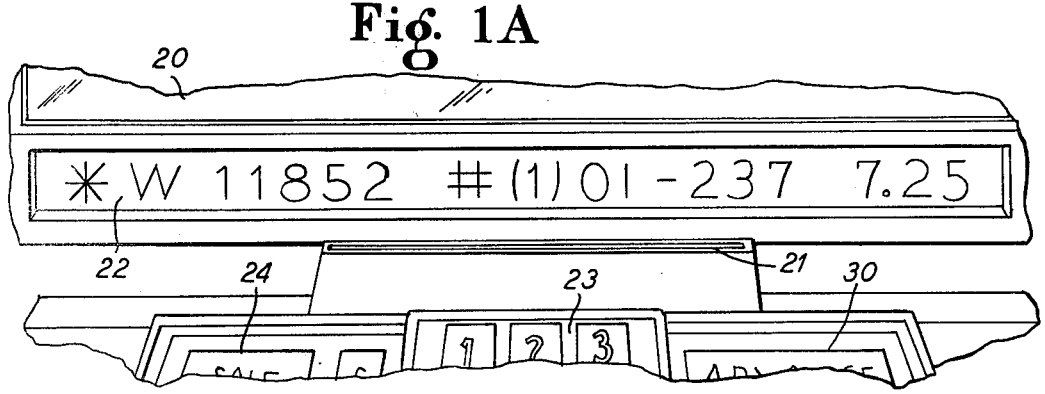
FIG. 1A is a fragmentary view of the digital display of the apparatus of FIG. 1, shown in greater detail.

The parts man then enters the locator number portion 43 with the keyboard keys 23 and presses the PRICE key 31. In response to these actions, the scanner transport moves to the addressed column and reads that portion of the column called for by the address. An an example, and referring to FIG. 14, the entry from the address register 180 into the comparator register 182 may set up a basis of comparison which instructs the microprocessor and associated circuits to cause the scanner sensor to read only those bits occuring after the sensor scans a predetermined number of bits. The scanner control 202 feeds the scanned information into the comparator register 182 via the auxiliary code register 200. The comparator register 182, over a similar path back to the scanner control 202, which comprises logic circuits, monitors the data being presented from the scanner sensor 98 to the sensor register 102 so that the information finally lodged in the auxiliary code register is that portion of the scanned line defined by the address of the locator number. Actuation of this process by depression of the key 31 causes the desired information to be output to the display unit 22. As can be seen in FIG. 1A, the manufacturer's part number W 11852 is displayed as a check, as is the price fiche locator number (1) 01-237. In addition, the asterisk appearing on the display tells the parts man that the dealer has that part in stock. The information to the far right-hand side indicates that the desired part has a price of $7.25. Again, the locator number in the central portion of the display forms the parts man of the physical location of the part.

The desired part is retrieved and the parts man copies the information from the display line onto the customer's sales invoice.

Then, for the dealership records, the parts man presses the SALE key 24, and possibly also the ORDER key 26 before depressing the PRINT key 29. The key 29 activates the line printer 14 which immediately copies the part information, error-free, from the entire display line onto a printer tape. The entry is thereby logged as a part of the day's transactions.

In cases where the part is common to several subassemblies, a # appears as a part of the display to indicate that the locator number is a composite number. Inasmuch as the information on that part would appear on many parts microfiche and have numerous locator numbers, a single number is selected as the locator and appears on the master microfiche, the price microfiche and on the stop bins.

In situations where a telephone inquiry is made and the customer can provide the manufacturer's part number directly, the parts man can immediately access the correct master microfiche of the few necessary master microfiche which carry all of the manufacturer's parts in alphanumeric order.

Upon selecting the correct master microfiche, he places the same in the viewer slot 21 and presses the HOME key 33. As with the parts microfiche, the master microfiche is addressed and moved to the home frame, generally the first frame.

The home frame comprises an index or the first page of an index which states that the part numbers in the area under investigation are located at frame 47. He then enters 47 with the keys 23 and presses the ADVANCE key which, as before, causes the desired frame to appear on the viewer screen 20. He there finds the manufacturer's part number provided by the customer, which, in this example, again is part W 11852, as seen in FIG. 2. As also illustrated in FIG. 2 this part number corresponds to the locator number (1) 01-237. The parts man can now select the price microfiche (1) and proceed as in the foregoing example.

Cancellations are also readily handled with this PMIC system. If a customer calls later to cancel an order, the parts man can simply bring up the same display on the LED unit 22, depress the CANCEL key 27 and then depress the PRINT key 29. The cancellation activates both the printer 14 and the magnetic tape recorder 15.

A number of conveniences for the parts man have been built into the system. The memory key MM can be used to enter all part locator numbers calling for the same price microfiche and recalled by pressing the MR key and then the PRICE key to display the line of information. The clear entry CE key permits the parts man to recover from a faulty entry, as is common practice with calculator devices, and the RETRACE key 32 permits the parts man to retrace frames step-by-step previously called for up to, for example, 32 frames in that the internal built-memory is a last in-first out (LIFO) memory.

The parts man will find the printed tape an essential part of his operation in that it carries all transactions identified by the symbols SALE, CHARGE, ORDER, CANCELLATION that was a SALE or a CHARGE or an ORDER, or a CANCELLATION. The printed tape also carries information entered directly from the keyboard, for example the printing of the customer's invoice number with each transaction.

The system also allows the parts man to order a particular quantity, by calling up the price line, by keying in the desired quantity, depressing the Q key 28 depressing the ORDER key 26 and then the key 29.

Should the dealer desire to have a listing of all the transactions of the day arranged by type, all transactions can be placed on the magnetic tape during the day and then, at the end of the day, extracted type-by-type onto the print tape, by use of optional additional controls associated with the magnetic recorder.

The printed tape is a permanent record of the day's activity in the parts department, as well as a record of the day's orders contained on the magnetic tape. At the end of the day, when the parts man is ready to submit orders to the computer 19 at the factory, he places a telephone call with the conventional telephone instrument 17 and dials in his assigned identification code. He is then interfaced with the computer 19 which will accept the data from the magnetic tape unit 15. He then places the telephone hand set on the MODEM unit 16 and activates playing of the magnetic tape through the MODEM unit 16, the telephone 17 and the telephone network 18 to the computer 19.

Such daily, or even weekly communication, though it requires typically only a few minutes of telephone time, provides for frequent order fulfillment from the manufacturer's warehouse. Frequent order and fulfillment capability provides accuracy in "real" inventory maintenance.

In an ON-line real-time situation, speedy and frequent delivery must be made in order to justify the high costs involved. Although the instant PMIC system is based on fast and frequent deliver, it can, through the nature of its low cost, maintain a high degree of efficiency while permitting a more modest delivery system in terms of turn-around time.

To this point, the PMIC system described has serviced six of the seven critical areas previously stressed including quick access to parts identification and price, fast retrieval from storage bins, complete records, daily ordering and frequent fulfillment.

As to up-dating and maintaining a smoothly functioning system, the key is the microfiche as a data base, which is distributed at the remote locations, on safe, read-only microfiche media.

A PMIC system requires information that is both accurate and current—current enough for the application, yet costing no more than absolutely necessary. The price microfiche plays a particularly special communications role in providing this information up-date feature, both accurately and economically. Heretofore, a troublesome particularly disadvantageous drawback to the use of microfilm verses paper was the inability to correct errors regarding price or part information. When a parts man became aware of an error he could not make a note of it on microfilm as he could on paper. Now, however, with the advent of the scanner the cooperable COM-generated digital microfiche having high-density digitized information, errors are quickly and economically recified.

The price microfiche are replaced at responsible intervals and each may contain a special section which holds inventory up-date information. When the parts man receives a new price microfiche he may place the same in the scanner and press a predetermined address, for example 30–300 on the keyboard and then the PRICE key. In response to this action, the title line of a list of special messages appears on the display. He may, at this point, elect to read these messages one-by-one by pressing the PRICE key each time. Or, he may elect to use the PRINT key and obtain a print out of all the messages.

The price microfiche also supplies the corrective information required for a part: substitutions, parts that have become obsolete, new interchangeable parts, replacements, and errors.

When the locator number for such a part is used, the display line appears, but special information on the digitized price microfiche energizes, in an automatically flashing manner, a lamp below the PRICE key. This signals that there is corrective information on this part. By pressing the PRICE key, the correct information will appear on the line; in this case, a substituted part number.

All of the critical areas noted above have now been served: part identification, price, retrieval from storage, records, ordering, order fulfillment, and up-dating of inventory information and corrections.

From the foregoing, it is readily apparent that the PMIC system disclosed herein is a totally integrated communications system which is readily expandable in function to economically meet the data base and random access requirements of business, industry, education military and government.

V. SINGLE MICROFICHE CONTROL SYSTEMS

A. Banking and Credit Check Examples

As mentioned above, bank account signature cards may be placed on viewer-type microfiche with the account number serving as an address of the frame on which the signature will appear. Inasmuch as a great number of signatures can be placed on a frame, account numbers would be grouped and a decoder included to define a common address for a plurality of signatures. Keying in of the account number would then cause the viewer to function as before so that the desired signature, along with signatures of the same frame, will be brought into view for checking the same against the signature on a check, withdrawal slip or the like.

Figure 1B:
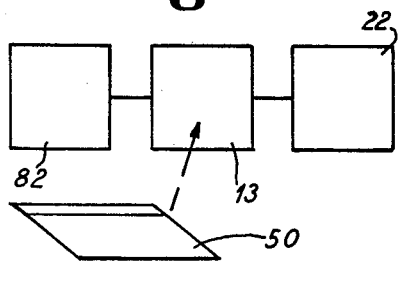
FIG. 1B is a schematic representation of the scanner as applied to bank account and credit account status checking.

Privacy in checking account status and other information may be obtained by utilizing, in a separate system, the scanner 13, the LED display unit 22 and a keyboard, all located in the same housing. Referring to FIG. 1B and FIG. 7, the system would operate as described above such that the account number, properly keyed in, will cause the scanner to find the proper account and provide the account information on the display. FIG. 1B illustrates the scanner 13 connected to the keyboard 82 of FIG. 7 and receiving a digitized microfiche 50 of the type illustrated in FIG. 5, for feeding information to a display unit 22.

B. TV Applications

Referring to FIG. 7 the circuit is shown adapted for display of the digitized information carried by the scannertype microfiche on a TV set 101, the information being fed from the data processing circuits 96 to the TV set 101 by way of a video display generator 103. The video display generator may be constituted by, for example, the video display generator S68047 manufactured by American Microsystems, Inc.

C. Computer Programming

Figure 1C:
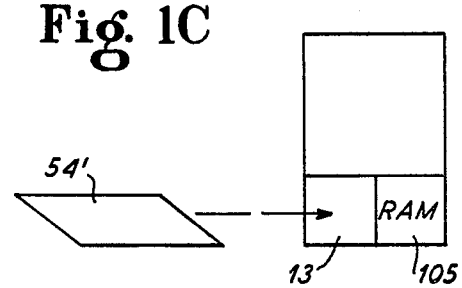
FIG. 1C is a schematic representation of a scanner as a part of a computer for programming the computer.
Figure 6:
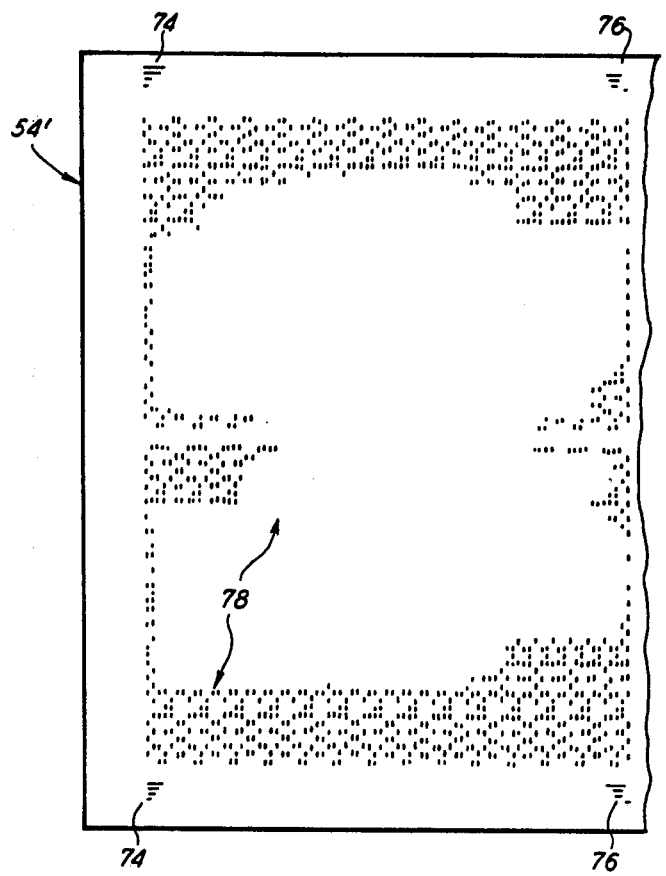
FIG. 6 illustrates a portion of another scanner (price) microfiche, similar to that illustrated in FIG. 5, on which the digital information is COM-generated information.

Referring to FIGS. 1C and 7, a computer such as a home computer is generally illustrated as comprising a program section including a RAM 105 which is fed by a scanner 13 which receives the program on a digital microfiche 54' of the type illustrated in FIG. 6. In this embodiment, there is no addressing of the scanner and the keyboard and entry register would include a permanent sequential address for sequentially stepping the scanner to output the program to the ram 105. A more simple control circuit may be included in the scanner in place of the microprocessor to merely step the scanner through its sequence of operations. The embodiment of FIG. 5 may also be used as a ROM and accessed by addressing of the scanner by the computer.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. Apparatus for reading a microfiche which bears rows of digital information and addresses for the rows of digital information, comprising:
   microfiche support means for receiving a digitized microfiche thereon;
   an optical sensor for reading the digital information on the microfiche;
   transport means mounting one of said support means and sensor for movement one relative the other;
   input means for selectively inputting the row addresses;
   control means connected between said input means and said transport means and responsive to an address to cause said transport means to position the addressed row of the microfiche in alignment with said sensor; and
   output means connected to said sensor, including display means for displaying the addressed information.

2. Apparatus for reading a microfiche which bears areas of digital information, comprising:
   scanning means for optically scanning the areas of digital information in a predetermined sequence to generate digital signals corresponding to the stored information;
   memory means connected to said scanning means for receiving and storing the digital signals;
   conversion means connected to said memory means for converting the digital signals into corresponding signals representing alphanumeric information; and
   display means connected to said conversion means and responsive to the corresponding signals representing alphanumeric information to display alphanumeric characters.

3. A method of reading a microfiche which bears areas of digital information thereon, comprising the steps of:
   optically scanning and generating electrical signals representing the digital information;
   storing information representing the electrical signals;
   converting the stored information into signals representing alphanumeric information; and
   displaying alphanumeric information in response to the converted signals.

4. Apparatus for reading a microfiche card which carries digital information, comprising:
   scanning means positioned adjacent the microfiche card for optically scanning the microfiche card and producing digital signals;
   converter means connected to said scanning means for converting the digital signals into other signals representing graphic information; and
   display means connected to said converter means and responsive to said other signals to display the graphic information.

5. The apparatus of claim 4, wherein:
   said converter means comprises a video generator; and
   said display means is a television receiver.

6. The apparatus of claim 4, wherein:
   said converter comprises a decoder; and
   said display means comprises an alphanumeric display unit.

7. A method of reading a microfiche card which carries digital information, comprising the steps of:
   optically scanning and generating first electrical signals representing the information by positioning and operating a scanner adjacent the card;
   converting the first electrical signals into second electrical signals representing graphic information; and
   applying the second electrical signals to a display unit to display graphic images corresponding to the scanned information.

8. The method of claim 7, wherein the step of converting is further defined as converting the first electrical signals into video signals.

9. The method of claim 7, wherein the step of generating is further defined as generating digital first electrical signals and the step of converting is further defined as decoding the digital first signals into digital second signals representing alphanumeric characters.

10. A parts management and inventory control system comprising:
    a plurality of first microfiche, each of said first microfiche including a first header and a first body, said first body including addressed first areas of optically viewable parts information and an index area bearing parts descriptions and corresponding first addresses, and said header bearing indicia designating the parts contained on that microfiche;
    a plurality of second microfiche, each of said second microfiche including a second header and a second body, said second header bearing indicia identifying the respective second microfiche, and said body including addressed second areas of digital information each including manufacturer's part number and price;
    said viewable parts information on said first body including for each respective part a locator number which includes a first portion which is the identifying indicia of the corresponding second microfiche and a second portion which constitutes the address of the respective part information on that second microfiche;
    a viewer including a microfiche viewer transport means for receiving a first microfiche and an optical system having a viewing screen, said viewer also including homing means operable to position said viewer transport means such that said index area is projected on said viewing screen, and first key-in addressing means operable in response to keying-in a first address to position said transport means such that a desired addressed first area is projected on said viewing screen;

a scanner including an optical scanning sensor means for receiving a second microfiche, and second keying addressing means operable in response to keying-in a second portion of a locator number to cause said sensor means to scan the digital information identified by the keyed-in second portion of the locator number;

an alphanumeric display connected to said scanner; and display activation means connected to said scanner for converting and applying the digital information to said display means.

11. The apparatus of claim 10, wherein:
each of said first microfiche comprises, in each of said first area, pictorial views of the parts and alphanumeric descriptions of the parts.

12. The apparatus of claim 10, wherein:
each of said second microfiche comprises, in each of said second areas, digital information stating whether the respective part is carried in stock.

13. A parts management and inventory control system comprising:
a plurality of first microfiche, each of said first microfiche including a first header and a first body, said first body including addressed first areas of optically viewable parts information and an index area bearing parts descriptions and corresponding first addresses, and said header bearing indicia designating the parts contained on that microfiche;

a plurality of second microfiche, each of said second microfiche including a second header and a second body, said second header bearing indicia identifying the respective second microfiche, and said body including addressed second areas of digital information each including manufacturer's part number and price;

said viewable parts information on said first body including for each respective part a locator number which includes a first portion which is the identifying indicia of the corresponding second microfiche and a second portion which constitutes the address of the respective part information on that second microfiche;

a viewer including an optical system, a viewing screen, transport means for receiving and positioning a first microfiche with respect to said optical system;

a scanner including an opto-electric scanning sensor means for receiving and scanning a second microfiche;

an alphanumeric display means; and control means connected to said viewer, said scanner and said alphanumeric display means, said control means including address input means including pre-programmed home address means and selectively operable addressing keys, a programmed control circuit connected to said viewer transport means, to said scanner and to said address input means, first activation means connected to said control circuit and operable to cause said control circuit to position said transport means so that said index area appears on said viewer screen to provide a parts address to be selectively keyed-in with said addressing keys, second activation means connected to said control circuit and operable to cause said control circuit to position said transport means so that the addressed first area appears on said viewer screen to provide the corresponding information including the desired locator number whose second portion is to be selectively keyed-in with said addressing keys to access a second microfiche identified by the first portion of said locator number, and third activation means connected to said control circuit and operable to cause said control circuit to operate said scanner to read the addressed second area and apply the read information to said alphanumeric display means.

14. The system of claim 13, and further comprising:
a printer connected to said control circuit; and
fourth activation means connected to said control circuit and operable to cause control circuit to activate said printer to record the information appearing on said alphanumeric display means.

15. The system of claim 14, and further comprising:
magnetic recorder means connected to said control circuit; and
fifth activation means operable to cause said control circuit to activate said recorder to record the content of the alphanumeric display means and specific order data.

16. The system of claim 15, wherein said fifth activation means includes selectively operable cancel and order keys which are operable to provide the respective order data.

17. The system of claim 16, and further comprising:
a remotely located parts order computer which is connectible to a telephone system; and
a modulator demodulator unit which may be coupled to the telephone system and which is connected to said magnetic recorder means for transmitting the content of the recorder means to said computer.

18. The system of claim 13, and further comprising a parts facility housing said system, said parts facility including a plurality of parts locations, each of said parts locations bearing a respective one of said locator number.

19. The system of claim 13, wherein:
said viewable parts information includes drawings of the parts and a tabulation of alphanumeric information concerning the respective parts.

20. Apparatus for checking financial account information, comprising:
a display device;
a microfiche card bearing addressed areas each of which includes digital account information;
a scanner operatively connected to said display device and including an optical sensor for sensing the digital account information, a digital to graphic information converter, and a control circuit connected to operate said scanner in response to an input address to scan an addressed area; and
key address input means connected to said control circuit and operable to input an account number as an address.

21. A bank signature card system comprising:
a microfiche card bearing areas containing customer signatures and addresses corresponding to the customer account numbers and identifying the locations of the signatures;
an optical system including a microfiche transport and a viewing screen;

a control circuit connected to drive said transport to an addressed area in response to an input address; and an input keyboard connected to said control circuit and operable to key-in a customer account number as an address to bring the respective signature on the viewing screen.

22. A bank signature card system comprising:

a microfiche card bearing areas containing customer signatures and addresses corresponding to the customer account numbers and identifying the locations of the signatures;

an optical system including a microfiche card transport and a viewing screen;

a control circuit connected to drive said transport in response to input addresses; and an input keyboard connected to said control circuit and operable to key-in a customer account number to cause said control circuit to operate said microfiche card transport to bring the respective signature on the viewing screen.

23. A financial management and control system comprising:

a plurality of first microfiche, each of said first microfiche including a first header and a first body, said first body including addressed first areas of optically viewable customer signatures and an index area bearing customer names and account numbers as first addresses, and said header bearing indicia designating the group of signatures contained on that microfiche;

a plurality of second microfiche, each of said second microfiche including a second header and a second body, said second header bearing indicia identifying the respective second microfiche, and said body including addressed second areas of digital information each including customer account information;

said viewable parts information on said first body including for each respective signature a locator number which includes a first portion which is the identifying indicia of the corresponding second microfiche and a second portion which constitutes the address of the respective customer account information on that second microfiche;

a viewer including a microfiche viewer transport means for receiving a first microfiche and an optical system having a viewing screen, said viewer also including homing means operable to position said viewer transport means such that said index area is projected on said viewing screen to check customer names and account numbers, and first key-in addressing means operable in response to keying-in a first address to position said transport means such that a desired addressed first area and the desired signature is projected on said viewing screen;

a scanner including an optical scanning sensor means for receiving a second microfiche, and second key-in addressing means operable in response to keying-in the second portion of a locator number to cause said sensor means to scan the digital information identified by the keyed-in second portion of the locator number;

an alphanumeric display connected to said scanner; and display activation means connected to said scanner for converting and applying the digital information to said display means.

24. The system of claim 23, wherein said address portion of said locator number comprises the customer account number.

25. The system of claim 23, wherein said customer account information constituted by digital information on a second microfiche comprises the customer account number.

26. A financial management and control system comprising:

a plurality of first microfiche, each of said first microfiche including a first header and a first body, said first body including addressed first areas of optically viewable customer signatures and an index area bearing customer names and corresponding account numbers as first addresses, and said header bearing indicia designating the group of signatures contained on that microfiche;

a plurality of second microfiche, each of said second microfiche including a second header and a second body, said second header bearing indicia identifying the respective second microfiche, and said body including addressed second areas of digital information each including customer account information;

said viewable parts information on said first body including for each respective signature a locator number which includes a first portion which is the identifying indicia of the corresponding second microfiche and a second portion which constitutes the address of the respective customer account information on that second microfiche;

a viewer including an optical system, a viewing screen, transport means for receiving and positioning a first microfiche with respect to said optical system;

a scanner including an opto-electric scanning sensor means for receiving and scanning a second microfiche;

an alphanumeric display means; and control means connected to said viewer, said scanner and said alphanumeric display means, said control means including address input means including pre-programmed home address means and selectively operable addressing keys, a programmed control circuit connected to said viewer transport means, to said scanner and to said address input means, first activation means connected to said control circuit and operable to cause said control circuit to position said transport means so that said index area appears on said viewer screen to provide a check of customer name against account number and obtain the address to be selectively keyed-in with said addressing keys, second activation means connected to said control circuit and operable to cause said control circuit to position said transport means so that the addressed first area appears on said viewer screen to provide the corresponding customer signature and the locator number whose second portion is to be selectively key-in with said addressing keys to access a second microfiche identified by the first portion of said locator number, and third activation means connected to said control circuit and operable to cause said control circuit to operate said scanner to read the addressed second area and apply the read account information to said alphanumeric display means.

27. The system of claim 26, wherein said address portion of said locator number comprises the customer account number.

28. The system of claim 26, wherein said customer account information constituted by digital information on a second microfiche comprises the customer account number.

* * * * *